United States Patent
Wang et al.

(10) Patent No.: US 11,018,518 B2
(45) Date of Patent: May 25, 2021

(54) INTELLIGENT WIRELESS CHARGING CONTROL METHOD, DEVICE, AND SYSTEM

(71) Applicant: Huawei Technologies Co., Ltd., Shenzhen (CN)

(72) Inventors: Pinghua Wang, Shenzhen (CN); Kangmin Huang, Shenzhen (CN); Weidong Tang, Shenzhen (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 360 days.

(21) Appl. No.: 16/016,231

(22) Filed: Jun. 22, 2018

(65) Prior Publication Data

US 2018/0301925 A1  Oct. 18, 2018

Related U.S. Application Data

(63) Continuation of application No. PCT/CN2017/112984, filed on Nov. 25, 2017.

(30) Foreign Application Priority Data

Dec. 8, 2016 (CN) .......................... 201611122400.5

(51) Int. Cl.
  *H02J 7/02* (2016.01)
  *H02J 50/80* (2016.01)
  *H02J 7/00* (2006.01)
(52) U.S. Cl.
  CPC ............ *H02J 7/025* (2013.01); *H02J 7/0071* (2020.01); *H02J 50/80* (2016.02)
(58) Field of Classification Search
  CPC ...................................................... H02J 7/025
  (Continued)

(56) References Cited

U.S. PATENT DOCUMENTS

2010/0253281 A1  10/2010  Li
2011/0018679 A1  1/2011  Davis et al.
(Continued)

FOREIGN PATENT DOCUMENTS

CN  102498634 A  6/2012
CN  102812618 A  12/2012
(Continued)

OTHER PUBLICATIONS

Machine Translation and Abstract of Chinese Publication No. CN104852430, Aug. 19, 2015, 12 pages.
(Continued)

*Primary Examiner* — Yalkew Fantu
(74) *Attorney, Agent, or Firm* — Conley Rose, P.C.

(57) ABSTRACT

A method for intelligently controlling a wireless charging receiving device, where the method includes obtaining at least one of a first environment parameter, a first status parameter, or a first historical record of a wireless charging receiving device, setting a wireless charging requirement according to at least one of the first environment parameter, the first status parameter, or the first historical record, transmitting the wireless charging requirement to a wireless charging transmission device, receiving an energy signal, generating a wireless charging stop instruction according to the wireless charging requirement or a user instruction, and sending the wireless charging stop instruction to the wireless charging transmission device. Therefore, intelligent control over a wireless charging process is implemented, a personalized requirement of a user is satisfied, and user experience is improved.

20 Claims, 9 Drawing Sheets

(58) Field of Classification Search
USPC .......................................................... 320/108

See application file for complete search history.

(56) References Cited

U.S. PATENT DOCUMENTS

| | | | |
|---|---|---|---|
| 2011/0221389 | A1 | 9/2011 | Won et al. |
| 2012/0149307 | A1* | 6/2012 | Terada ................... H02J 7/025 455/66.1 |
| 2013/0063082 | A1* | 3/2013 | Lee ........................ H02J 7/025 320/108 |
| 2014/0008990 | A1* | 1/2014 | Yoon ...................... H02J 5/005 307/104 |
| 2015/0263540 | A1 | 9/2015 | Culbert et al. |
| 2015/0312740 | A1* | 10/2015 | Li ........................... H04W 4/90 455/404.2 |
| 2015/0373723 | A1* | 12/2015 | Zhang .................... H04L 47/29 370/311 |
| 2016/0094076 | A1 | 3/2016 | Kasar et al. |
| 2016/0352155 | A1 | 12/2016 | Iwasaki |
| 2017/0047786 | A1 | 2/2017 | Park et al. |
| 2017/0271907 | A1 | 9/2017 | Zhang et al. |
| 2017/0346349 | A1 | 11/2017 | Shimokawa |

FOREIGN PATENT DOCUMENTS

| | | |
|---|---|---|
| CN | 202721507 U | 2/2013 |
| CN | 103618355 A | 3/2014 |
| CN | 103762695 A | 4/2014 |
| CN | 103765797 A | 4/2014 |
| CN | 104852430 A | 8/2015 |
| CN | 105098924 A | 11/2015 |
| CN | 105099007 A | 11/2015 |
| CN | 105244943 A | 1/2016 |
| CN | 105262514 A | 1/2016 |
| CN | 106208422 A | 12/2016 |
| CN | 106451684 A | 2/2017 |
| EP | 2634927 A1 | 9/2013 |
| JP | 2011211866 A | 10/2011 |
| JP | 2012125112 A | 6/2012 |
| JP | 2012523813 A | 10/2012 |
| JP | 2013500693 A | 1/2013 |
| JP | 2014225989 A | 12/2014 |
| JP | 2015165761 A | 9/2015 |
| WO | 2015156628 A1 | 10/2015 |
| WO | 2016135864 A1 | 9/2016 |

OTHER PUBLICATIONS

Machine Translation and Abstract of Chinese Publication No. CN105099007, Nov. 25, 2015, 19 pages.

Machine Translation and Abstract of Chinese Publication No. CN105262514, Jan. 20, 2016, 18 pages.

Foreign Communication From a Counterpart Application, Chinese Application No. 201611122400.5, Chinese Search Report dated Sep. 2, 2018, 2 pages.

Foreign Communication From a Counterpart Application, Chinese Application No. 201611122400.5, Chinese Office Action dated Sep. 10, 2018, 5 pages.

Machine Translation and Abstract of Japanese Publication No. JP2011211866, Oct. 20, 2011, 22 pages.

Machine Translation and Abstract of Japanese Publication No. JP2014225989, Dec. 4, 2014, 22 pages.

Foreign Communication From a Counterpart Application, Japanese Application No. 2018-531530, Japanese Office Action dated Jul. 22, 2019, 3 pages.

Foreign Communication From a Counterpart Application, Japanese Application No. 2018-531530, English Translation of Japanese Office Action dated Jul. 30, 2019, 5 pages.

Foreign Communication From a Counterpart Application, European Application No. 17878928.5, Extended European Search Report dated Oct. 24, 2018, 10 pages.

Machine Translation and Abstract of Chinese Publication No. CN103618355, Mar. 5, 2014, 13 pages.

Machine Translation and Abstract of Chinese Publication No. CN103762695, Apr. 30, 2014, 12 pages.

Machine Translation and Abstract of Chinese Publication No. CN105244943, Jan. 13, 2016, 9 pages.

Machine Translation and Abstract of Chinese Publication No. CN106208422, Dec. 7, 2016, 12 pages.

Machine Translation and Abstract of Chinese Publication No. CN106451684, Feb. 22, 2017, 33 pages.

Machine Translation and Abstract of Chinese Publication No. CN202721507, Feb. 6, 2013, 5 pages.

"A New Apple Invention Covers Inductive Charging Between iOS Devices and even a MacBook," Patently Apple, Mar. 31, 2016, 8 pages.

Foreign Communication From a Counterpart Application, PCT Application No. PCT/CN2017/112984, English Translation of International Search Report dated Mar. 1, 2018, 2 pages.

Foreign Communication From a Counterpart Application, European Application No. 17878928.5, European Office Action dated Jun. 26, 2019, 4 pages.

Johns, B., "An introduction to the Wireless Power Consortium standard and TI"s compliant solutions," XP055212962, Analog Applications Journal, High-Performance Analog Products, www.ti.com/aaj, Texas Instruments Incorporated, Mar. 31, 2011, 6 pages.

Foreign Communication From A Counterpart Application, European Application No. 17878928.5, European Office Action dated Jan. 28, 2020, 4 pages.

* cited by examiner

| Antenna design | Connection manner | Remarks |
|---|---|---|
| S type |  | An inductance component and a capacitor component are connected in series |
| P type | 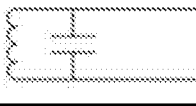 | An inductance component and a capacitor component are connected in parallel |
| LCL type | 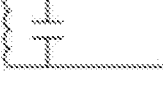 | A capacitor component and two inductance components are connected in parallel |
| LCC type | 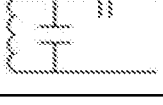 | An inductance component and a capacitor component are connected in parallel |
| LCLC type | 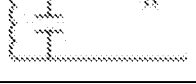 | Two inductance components and two capacitor components are connected in parallel |

FIG. 2

INTELLIGENT WIRELESS CHARGING CONTROL METHOD, DEVICE, AND SYSTEM

CROSS-REFERENCE TO RELATED APPLICATIONS

This application is a continuation of International Patent Application No. PCT/CN2017/112984 filed on Nov. 25, 2017, which claims priority to Chinese Patent Application No. 201611122400.5 filed on Dec. 8, 2016, both of which are hereby incorporated by reference in their entireties.

TECHNICAL FIELD

The present disclosure relates to the energy field, and in particular, to an intelligent wireless charging control method and device.

BACKGROUND

Development of a battery technology plays a pivotal role in promoting development of intelligent mobile terminal and electric automobile industries, and the like. However, as the battery technology is continuously upgraded, a charging problem becomes one of critical problems that restrict rapid development of the battery technology. In recent years, in order to resolve the charging problem, a wireless charging technology is considerably developed, and in reality, various wireless charging products for different requirements emerge continuously.

Currently, for wireless charging, there may be three transmission modes an electromagnetic induction transmission mode, a radio wave transmission mode, and a magnetic resonance transmission mode. The radio wave transmission mode is characterized by low transmit power, high energy consumption, and low feasibility. Generally, in actual application, the electromagnetic induction transmission mode or the magnetic resonance transmission mode is usually used for a wireless charging product.

With development of the wireless charging technology and promotion of a standard, a wireless charging product is designed more diversely according to a technology type, a standard protocol, a vendor design, and the like. For example, STARBUCKS, IKEA, and HAIER all integrate a wireless charging device into a product or a service thereof, such as a coffee table with a wireless charger of STARBUCKS, a smart home product with wireless charging of IKEA, and a smart kitchen and a smart office desk of HAIER, greatly improving user experience. However, a wireless charging control technology makes no breakthrough with a continuous increase in wireless charging products in different forms and development of a Device to Device (D2D) wireless charging technology. An existing wireless charging control method is still simple. For example, a capacity threshold is set to control a stop of wireless charging. This cannot satisfy requirements for control over diversified wireless charging products and for user personalization. Consequently, user experience of the wireless charging technology is poor.

SUMMARY

To resolve the foregoing problem, the present disclosure provides a method and a device for intelligently controlling a wireless charging receiving device and a method and a device for intelligently controlling a wireless charging transmission device. A wireless charging requirement is set according to at least one of an environment parameter, a status parameter, or a historical charging record of a wireless charging receiving device, and a wireless charging process is controlled based on the wireless charging requirement. In this way, intelligent control over the wireless charging process can be implemented, and user experience of a wireless charging product can be improved.

A first aspect provides a method for intelligently controlling a wireless charging receiving device, where the method includes obtaining at least one of a first environment parameter, a first status parameter, or a first historical record, where the first environment parameter includes at least one of a geographical location, a temperature, humidity, an altitude, or a time of an environment in which the wireless charging receiving device is located, the first status parameter includes at least one of a battery level, a temperature, a voltage, or an energy consumption rate of the wireless charging receiving device, and the first historical record is a previous wireless charging data record of the wireless charging receiving device, setting a wireless charging requirement according to at least one of the first environment parameter, the first status parameter, or the first historical record, where the wireless charging requirement includes at least one of a wireless charging voltage, a wireless charging current, wireless charging power, a wireless charging speed, a wireless charging battery level, a wireless charging time, wireless charging costs, or the like, sending the wireless charging requirement to a wireless charging transmission device, receiving an energy signal, where the energy signal indicates energy that is obtained by the wireless charging transmission device by converting electric energy according to the wireless charging requirement and that can be converted back into the electric energy by the wireless charging receiving device, generating a wireless charging stop instruction according to the wireless charging requirement or a user instruction, and sending the wireless charging stop instruction to the wireless charging transmission device.

With reference to the first aspect, in a first possible implementation of the first aspect, before setting a wireless charging requirement according to at least one of the first environment parameter, the first status parameter, or the first historical record, the method further includes determining that at least one wireless charging communications protocol of the wireless charging receiving device is matched successfully with a wireless charging communications protocol of the wireless charging transmission device.

With reference to the first aspect or the first possible implementation of the first aspect, in a second possible implementation of the first aspect, before setting a wireless charging requirement according to at least one of the first environment parameter, the first status parameter, or the first historical record, the method further includes determining that the wireless charging transmission device is located in a wireless charging receiving region of the wireless charging receiving device.

With reference to the first aspect, the first possible implementation of the first aspect, or the second possible implementation of the first aspect, in a third possible implementation of the first aspect, the receiving an energy signal is receiving the energy signal after receiving a wireless charging start instruction fed back by the wireless charging transmission device.

With reference to the first aspect, the first possible implementation of the first aspect, the second possible implementation of the first aspect, or the third possible implementation of the first aspect, in a fourth possible implementation of the first aspect, generating a wireless charging stop instruction, and sending the wireless charging stop instruction to the wireless charging transmission device includes monitoring a second status parameter of the wireless charging receiving device, where the second status parameter includes at least one of a charged battery level, a charging voltage, a charging current, charging power, charging costs, or the like of the wireless charging receiving device, generating the wireless charging stop instruction according to a comparison between the second status parameter and the wireless charging requirement or according to an end instruction entered by a user, stop receiving the energy signal, and sending the wireless charging stop instruction to the wireless charging transmission device.

With reference to the first aspect, the first possible implementation of the first aspect, the second possible implementation of the first aspect, the third possible implementation of the first aspect, or the fourth possible implementation of the first aspect, in a fifth possible implementation of the first aspect, before setting a wireless charging requirement according to at least one of the first environment parameter, the first status parameter, or the first historical record, the method further includes obtaining configuration information sent by the wireless charging transmission device, where the configuration information is set by default at delivery or is customized by the user, and the configuration information includes at least one of a model, a brand, a type, a power parameter, a supported mode, or a service provider of the wireless charging transmission device.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation of the first aspect, the energy signal is magnetic field energy or quasi-electrostatic field energy.

A second aspect provides a method for intelligently controlling a wireless charging transmission device, where the method includes obtaining a wireless charging requirement of a wireless charging receiving device, where the wireless charging requirement includes at least one of a wireless charging voltage, a wireless charging current, wireless charging power, a wireless charging speed, a wireless charging battery level, a wireless charging time, wireless charging costs, or the like, configuring a transmission parameter according to the wireless charging requirement, transmitting an energy signal, where the energy signal indicates energy that is obtained by the wireless charging transmission device by converting electric energy based on the transmission parameter and that can be converted back into the electric energy by the wireless charging receiving device, and stop transmitting the energy signal after receiving a wireless charging stop instruction sent by the wireless charging receiving device.

With reference to the second aspect, in a first possible implementation of the second aspect, before the obtaining a wireless charging requirement of a wireless charging receiving device, the method further includes determining that at least one wireless charging communications protocol of the wireless charging transmission device is matched successfully with a wireless charging communications protocol of the wireless charging receiving device.

With reference to the second aspect or the first possible implementation of the second aspect, in a second possible implementation of the second aspect, before the obtaining a wireless charging requirement of a wireless charging receiving device, the method further includes determining that the wireless charging receiving device is located in a wireless charging transmission region of the wireless charging transmission device.

With reference to the second aspect, the first possible implementation of the second aspect, or the second possible implementation of the second aspect, in a third possible implementation of the second aspect, configuring a transmission parameter according to the wireless charging requirement includes at least one of configuring wireless charging transmit power or configuring a wireless charging right, configuring wireless charging transmit power is adjusting at least one of a voltage, a current, or a frequency of a transmission conversion circuit according to the wireless charging requirement to ensure output of the energy signal that is matched with the wireless charging requirement, and configuring a wireless charging right is setting a first right for the wireless charging receiving device according to the wireless charging requirement, where the first right corresponds to at least one of a charging time, charging efficiency, a charging rate, or a charging mode of the wireless charging transmission device.

With reference to the second aspect, the first possible implementation of the second aspect, the second possible implementation of the second aspect, or the third possible implementation of the second aspect, in a fourth possible implementation of the second aspect, transmitting an energy signal includes generating, by the wireless charging transmission device, a wireless charging start instruction after configuring a transmission parameter is completed, and sending the wireless charging start instruction to the wireless charging receiving device, and transmitting the energy signal.

With reference to the second aspect, the first possible implementation of the second aspect, the second possible implementation of the second aspect, the third possible implementation of the second aspect, or the fourth possible implementation of the second aspect, in a fifth possible implementation of the second aspect, stop transmitting the energy signal is stop transmitting the energy signal after receiving the wireless charging stop instruction fed back by the wireless charging receiving device.

With reference to the second aspect, the first possible implementation of the second aspect, the second possible implementation of the second aspect, the third possible implementation of the second aspect, the fourth possible implementation of the second aspect, or the fifth possible implementation of the second aspect, in a sixth possible implementation of the second aspect, before obtaining a wireless charging requirement of a wireless charging receiving device, the method further includes sending configuration information of the wireless charging transmission device to the wireless charging receiving device, where the configuration information is set by default at delivery or is customized by a user, and the configuration information includes at least one of a model, a brand, a type, a power parameter, a supported mode, or a service provider of the wireless charging transmission device.

With reference to the second aspect, the first possible implementation of the second aspect, the second possible implementation of the second aspect, the third possible implementation of the second aspect, the fourth possible implementation of the second aspect, the fifth possible implementation of the second aspect, or the sixth possible implementation of the second aspect, in a seventh possible implementation of the second aspect, the energy signal is magnetic field energy or quasi-electrostatic field energy.

A third aspect provides a wireless charging receiving device, where the device includes at least a status monitoring module, a charging policy module, a communications module, a receiving module, a control module, a battery module, a first storage module, and a second storage module, the status monitoring module is configured to obtain at least one of a first environment parameter, a first status parameter, or a first historical record, where the first environment parameter includes at least one of a geographical location, a temperature, humidity, an altitude, or a time of an environment in which the wireless charging receiving device is located, the first status parameter includes at least one of a battery level, a temperature, a voltage, or an energy consumption rate of the wireless charging receiving device, and the first historical record is a previous wireless charging data record of the wireless charging receiving device, the charging policy module is configured to set a wireless charging requirement based on at least one of the first environment parameter, the first status parameter, or the first historical record that is obtained by the status monitoring module, where the wireless charging requirement includes at least one of a wireless charging voltage, a wireless charging current, wireless charging power, a wireless charging speed, a wireless charging battery level, a wireless charging time, wireless charging costs, or the like, the communications module is configured to exchange data with a wireless charging transmission device, the receiving module is configured to receive an energy signal, convert the energy signal into electric energy, and store the electric energy in the battery module, where the energy signal indicates energy that is obtained by the wireless charging transmission device by converting the electric energy according to the wireless charging requirement and that can be converted back into the electric energy by the wireless charging receiving device, the control module is configured to configure a receiving parameter according to the wireless charging requirement set by the charging policy module, and control a start and a stop of wireless charging of the wireless charging receiving device, the battery module is configured to store the electric energy received by the receiving module, and supply power to the wireless charging receiving device, the first storage module is configured to store configuration information of the wireless charging receiving device, and the second storage module is configured to store process data.

With reference to the third aspect, in a first possible implementation of the third aspect, the device further includes a function matching module, and the function matching module is configured to determine that at least one wireless charging communications protocol of the wireless charging receiving device is matched successfully with that of the wireless charging transmission device.

With reference to the third aspect or the first possible implementation of the third aspect, in a second possible implementation of the third aspect, the device further includes a location alignment module, and the location alignment module is configured to determine that the wireless charging transmission device is located in a wireless charging receiving region of the wireless charging receiving device.

With reference to the third aspect, the first possible implementation of the third aspect, or the second possible implementation of the third aspect, in a third possible implementation of the third aspect, the receiving module includes at least a receive antenna and a conversion unit, the receive antenna is configured to receive the energy signal, and convert the energy signal into alternating current electric energy, and the conversion unit is configured to convert the alternating current electric energy, obtained through conversion by the receive antenna, into direct current electric energy, and transmit the direct current electric energy to the battery module.

With reference to the third aspect, the first possible implementation of the third aspect, the second possible implementation of the third aspect, or the third possible implementation of the third aspect, in a fourth possible implementation of the third aspect, the conversion unit includes a rectification unit and a direct-current conversion unit, the rectification unit is configured to convert the alternating current electric energy, obtained through conversion by the receive antenna, into the direct current electric energy, and the direct-current conversion unit is configured to input the direct current electric energy, obtained through conversion by the rectification unit, into the battery module as a constant direct current.

With reference to the third aspect, the first possible implementation of the third aspect, the second possible implementation of the third aspect, the third possible implementation of the third aspect, or the fourth possible implementation of the third aspect, in a fifth possible implementation of the third aspect, configuring a receiving parameter according to the wireless charging requirement set by the charging policy module is adjusting at least one of a voltage, a current, or a frequency of a receiving conversion circuit according to the wireless charging requirement.

With reference to the third aspect, the first possible implementation of the third aspect, the second possible implementation of the third aspect, the third possible implementation of the third aspect, the fourth possible implementation of the third aspect, or the fifth possible implementation of the third aspect, in a sixth possible implementation of the third aspect, the device further includes a display module and a user input module, the display module is configured to present a wireless charging parameter of a wireless charging process to a user, and the user input module is configured to enter, by the user, an instruction and a parameter that are related to the wireless charging.

A fourth aspect provides a wireless charging transmission device, where the device includes at least a power entry module, a communications module, a control module, a transmission module, a first storage module, and a second storage module, the power entry module is configured to obtain electric energy input by an external power supply, the communications module is configured to exchange data with a wireless charging receiving device, and receive a wireless charging requirement set by the wireless charging receiving device, where the wireless charging requirement includes at least one of a wireless charging voltage, a wireless charging current, wireless charging power, a wireless charging speed, a wireless charging battery level, a wireless charging time, wireless charging costs, or the like, the control module is configured to configure a transmission parameter according to the wireless charging requirement received by the communications module, and control a start and a stop of wireless charging of the wireless charging transmission device, the transmission module is configured to convert, based on the transmission parameter, the electric energy obtained by the power entry module into an energy signal, and output the energy signal, where the energy signal indicates energy that is obtained by the wireless charging transmission device by converting the electric energy according to the wireless charging requirement and that can be converted back into the electric energy by the wireless charging receiving device, the first storage module is configured to store configuration information of the wireless charging transmission device, and the second storage module is configured to store process data.

With reference to the fourth aspect, in a first possible implementation of the fourth aspect, the device further includes a function matching module, and the function matching module is configured to determine that at least one wireless charging communications protocol of the wireless charging transmission device is matched successfully with that of the wireless charging receiving device.

With reference to the fourth aspect or the first possible implementation of the fourth aspect, in a second possible implementation of the fourth aspect, the device further includes a location alignment module, and the location alignment module is configured to determine that the wireless charging receiving device is located in a wireless charging transmission region of the wireless charging transmission device.

With reference to the fourth aspect, the first possible implementation of the fourth aspect, or the second possible implementation of the fourth aspect, in a third possible implementation of the fourth aspect, the transmission module includes a power factor correction unit, an inverter unit, a transformer unit, and a transmit antenna, when the electric energy input by the external power supply is alternating current electric energy, the power factor correction unit is configured to reduce harmonic content in a transmission circuit, and increase a power factor value, when the electric energy input by the external power supply is direct current electric energy, the transformer unit is configured to convert the input direct current electric energy into alternating current electric energy, the inverter unit is configured to convert the alternating current electric energy, output by the power factor correction unit or the transformer unit, into high-frequency alternating current electric energy, and output a high-frequency alternating current electric energy to the power transmit antenna, and the transmit antenna is configured to convert the high-frequency alternating current electric energy, input by the inverter unit, into the energy signal, and output the energy signal.

With reference to the fourth aspect, the first possible implementation of the fourth aspect, the second possible implementation of the fourth aspect, or the third possible implementation of the fourth aspect, in a fourth possible implementation of the fourth aspect, configuring a transmission parameter according to the wireless charging requirement received by the communications module includes at least one of configuring wireless charging transmit power or configuring a wireless charging right, configuring wireless charging transmit power is adjusting at least one of a voltage, a current, or a frequency of a transmission conversion circuit according to the wireless charging requirement received by the communications module to ensure output of the energy signal that is matched with the charging requirement, and configuring a wireless charging right is setting a first right for the wireless charging receiving device according to the wireless charging requirement received by the communications module, where the first right corresponds to at least one of a charging time, charging efficiency, a charging rate, or a charging mode of the wireless charging transmission device. With reference to the fourth aspect, the first possible implementation of the fourth aspect, the second possible implementation of the fourth aspect, the third possible implementation of the fourth aspect, or the fourth possible implementation of the fourth aspect, in a fifth possible implementation of the fourth aspect, the device further includes a status monitoring module, and the status monitoring module is configured to obtain a second environment parameter, a second status parameter, and a second historical record, where the second environment parameter includes at least one of a geographical location, a temperature, humidity, an altitude, or a time of an environment in which the wireless charging transmission device is located, the second status parameter includes at least one of a battery level, a temperature, a voltage, or an energy consumption rate of the wireless charging transmission device, and the second historical record is a previous wireless charging data record of the wireless charging transmission device.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation of the fourth aspect, the device further includes a display module and a user input module, the display module is configured to present a wireless charging parameter of a wireless charging process to a user, and the user input module is configured to enter, by the user, an instruction and a parameter that are related to the wireless charging.

A fifth aspect provides an intelligent wireless charging control system, where the system includes an external power supply, a wireless charging receiving device, and a wireless charging transmission device, the wireless charging receiving device is the device in any possible implementation of the third aspect, the wireless charging transmission device is the device in any possible implementation of the fourth aspect, and the external power supply is connected to the wireless charging transmission device, and the wireless charging transmission device obtains electric energy from the external power supply.

A sixth aspect provides a wireless charging receiving terminal, where the terminal includes a communications module, a battery, a processing module, and a storage module, the communications module is configured to exchange data with a wireless charging transmission device, the battery is configured to store received electric energy, and supply power to the wireless charging receiving device, the storage module is configured to store a programmable instruction, the processing module is configured to invoke the programmable instruction stored in the storage module to perform obtaining at least one of a first environment parameter, a first status parameter, or a first historical record, where the first environment parameter includes at least one of a geographical location, a temperature, humidity, an altitude, or a time of an environment in which the wireless charging receiving device is located, the first status parameter includes at least one of a battery level, a temperature, a voltage, or an energy consumption rate of the wireless charging receiving device, and the first historical record is a previous wireless charging data record of the wireless charging receiving device, setting a wireless charging requirement according to at least one of the first environment parameter, the first status parameter, or the first historical record, where the wireless charging requirement includes at least one of a wireless charging voltage, a wireless charging current, wireless charging power, a wireless charging speed, a wireless charging battery level, a wireless charging time, wireless charging costs, or the like, sending the wireless charging requirement to the wireless charging transmission device, receiving an energy signal, where the energy signal is energy that is obtained by the wireless charging transmission device by converting the electric energy according to the wireless charging requirement and that can be converted back into the electric energy by the wireless charging receiving device, generating a wireless charging stop instruction, and sending the wireless charging stop instruction to the wireless charging transmission device.

With reference to the sixth aspect, in a first possible implementation of the sixth aspect, the generating a wireless charging stop instruction, and sending the wireless charging stop instruction to the wireless charging transmission device includes monitoring a second status parameter of the wireless charging receiving device, where the second status parameter includes at least one of a charged battery level, a charging voltage, a charging current, charging power, charging costs, or the like of the wireless charging receiving device, generating the wireless charging stop instruction according to a comparison between the second status parameter and the wireless charging requirement or according to an end instruction entered by a user, stop receiving the energy signal, and sending the wireless charging stop instruction to the wireless charging transmission device.

In embodiments of the present disclosure, the wireless charging requirement is set according to at least one of an environment parameter, a status parameter, or a historical charging record of the wireless charging receiving device, and the wireless charging process is controlled based on the wireless charging requirement. Therefore, intelligent control over the wireless charging process can be implemented, and user experience of a wireless charging product can be improved.

BRIEF DESCRIPTION OF DRAWINGS

FIG. 2 is a schematic structural diagram of a receive antenna according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
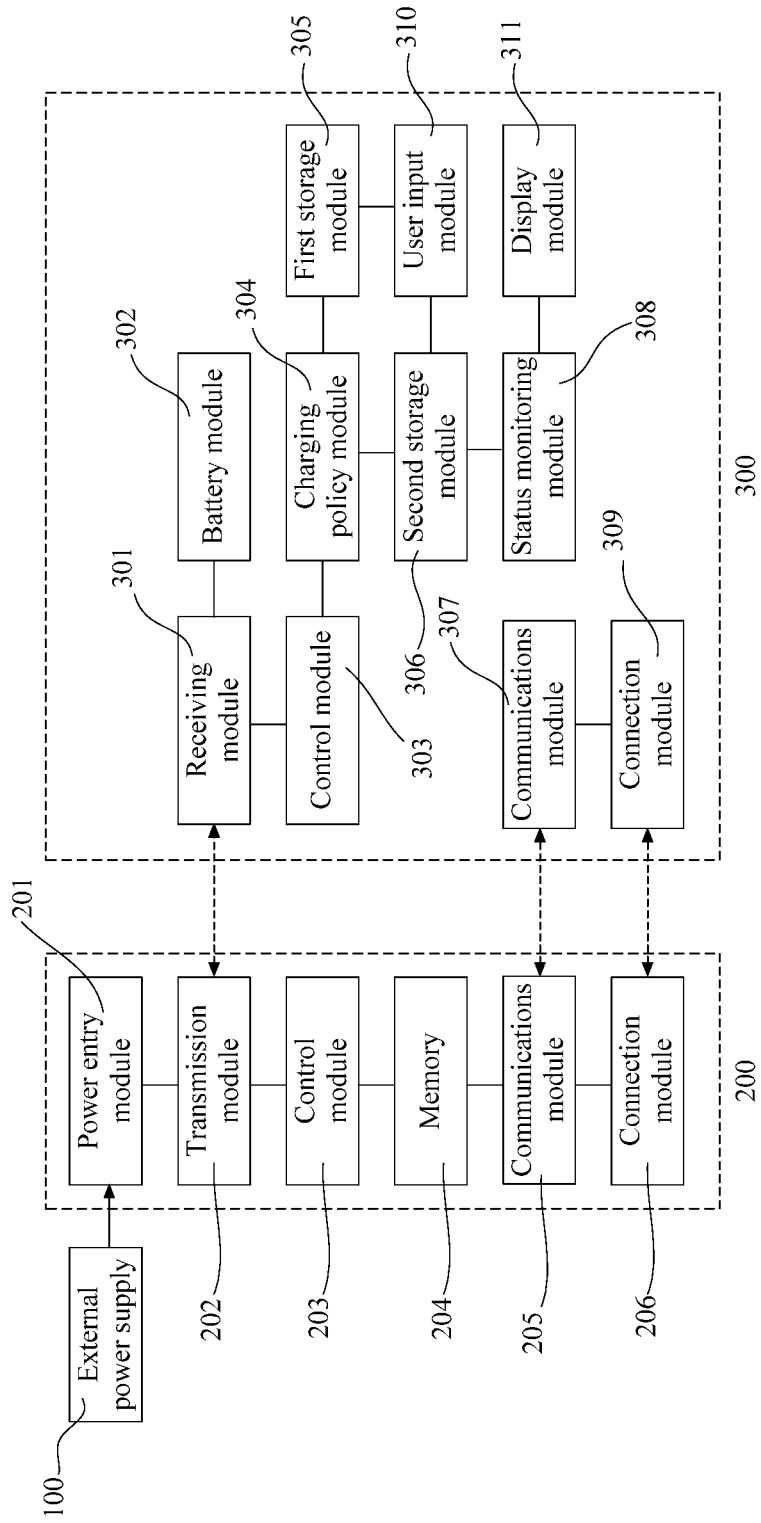
FIG. 1 is a schematic structural diagram of a wireless charging system according to an embodiment of the present disclosure.

An embodiment of the present disclosure provides an intelligent wireless charging control system. As shown in FIG. 1, the system includes an external power supply 100, a wireless charging transmission device 200, and a wireless charging receiving device 300. Optionally, the wireless charging transmission device 200 is a terminal or a product that integrates a wireless charging transmission circuit, such as a smart office desk or a vehicle. The wireless charging receiving device 300 is a terminal or a product that integrates a wireless charging receiving circuit, such as an intelligent mobile terminal or an electric vehicle.

The wireless charging transmission device 200 includes a power entry module 201, a transmission module 202, a control module 203, a memory 204, a communications module 205, and a connection module 206.

The power entry module 201 is configured to connect the wireless charging transmission device 200 and the external power supply 100, and receive electric energy input by the external power supply 100.

The connection module 206 is configured to determine that the wireless charging transmission device 200 is connected to the wireless charging receiving device 300. Further, the connection module 206 includes a function matching unit (not shown) and a location alignment unit (not shown). The function matching unit is configured to determine that at least one wireless charging communications protocol of the wireless charging receiving device 300 is matched successfully with that of the wireless charging transmission device 200. The location alignment unit is configured to determine that the wireless charging receiving device 300 is located in a wireless charging transmission region of the wireless charging transmission device 200.

The communications module 205 is configured to implement data transmission between the wireless charging transmission device 200 and the wireless charging receiving device 300. Optionally, the communications module 205 implements interaction in a wireless communication manner, for example, one or more of manners such as BLUETOOTH, WI-FI, ZIGBEE, radio frequency identification (RFID), LORA, or near field communication (NFC).

The control module 203 is configured to configure a transmission parameter, and control a start and a stop of wireless charging. Further, configuring a transmission parameter includes at least one of configuring wireless charging transmit power or configuring a wireless charging right. Further, configuring wireless charging transmit power is adjusting at least one of a voltage, a current, or a frequency of a transmission conversion circuit according to an obtained wireless charging requirement to ensure output of an energy signal that is matched with the charging requirement. Configuring a wireless charging right is setting a first right for the wireless charging receiving device. The first right corresponds to at least one of a charging time, charging efficiency, a charging rate, or a charging mode of the wireless charging transmission device.

The transmission module 202 is configured to convert the electric energy, input by the external power supply 100, into the energy signal, and output the energy signal. Further, the energy signal is intermediate energy that is obtained by converting the electric energy and that can be converted back into the electric energy. Further, the transmission module 202 includes a power factor correction unit (not shown), an inverter unit (not shown), a transformer unit (not shown), and a transmit antenna (not shown). Further, when the electric energy input by the external power supply 100 is alternating current electric energy, the power factor correction unit is configured to reduce harmonic content in a transmission circuit, and increase a power factor value. When the electric energy input by the external power supply 100 is direct current electric energy, the transformer unit is configured to convert the input direct current electric energy into alternating current electric energy. The inverter unit is configured to convert the alternating current electric energy, output by the power factor correction unit or the transformer unit, into high-frequency alternating current electric energy, and output a high-frequency alternating current electric energy to the power transmit antenna. The transmit antenna is configured to convert the high-frequency alternating current electric energy, input by the inverter unit, into the energy signal, and output the energy signal. Optionally, a receive antenna includes an inductance component and a capacitor component that are configured to output active power and reactive power. According to different connection manners between the inductance component and the capacitor component, the receive antenna may have any structure shown in FIG. 2.

The memory 204 is configured to store configuration information of the wireless charging transmission device 200 and data generated or received in a wireless charging process. Optionally, the configuration information of the wireless charging transmission device 200 is set by default at delivery or is entered by a user.

Optionally, the wireless charging transmission device 200 further includes a user input module (not shown) and a display module (not shown). Further, the display module is configured to present a parameter related to the wireless charging process to the user. The user input module is configured to enter, by the user, an instruction and a parameter that are related to the wireless charging.

Optionally, the wireless charging transmission device 200 is integrated into an intelligent product, such as a smart office desk or a vehicle.

The wireless charging receiving device 300 includes a receiving module 301, a battery module 302, a control module 303, a charging policy module 304, a first storage module 305, a second storage module 306, a communications module 307, a status monitoring module 308, and a connection module 309.

The connection module 309 is configured to determine that the wireless charging receiving device 300 is connected to the wireless charging transmission device 200. Further, the connection module 309 includes a function matching unit (not shown) and a location alignment unit (not shown). The function matching unit is configured to determine that at least one wireless charging communications protocol of the wireless charging receiving device 300 is matched successfully with that of the wireless charging transmission device 200. The location alignment unit is configured to determine that the wireless charging transmission device 200 is located in a wireless charging receiving region of the wireless charging receiving device 300.

The status monitoring module 308 is configured to obtain at least one of a first environment parameter, a first status parameter, or a first historical record. The first environment parameter includes at least one of a geographical location, a temperature, humidity, an altitude, or a time of an environment in which the wireless charging receiving device 300 is located. The first status parameter includes at least one of a battery level, a temperature, a voltage, or an energy consumption rate of the wireless charging receiving device 300. The first historical record is a previous wireless charging data record of the wireless charging receiving device 300.

The charging policy module 304 is configured to set a wireless charging requirement based on at least one of the obtained first environment parameter, first status parameter, or first historical record. Optionally, when setting the wireless charging requirement, the charging policy module 304 references one or more of configuration information, a related environment parameter, a status parameter, or a historical charging record of the wireless charging transmission device 200. Optionally, the wireless charging requirement may be a parameter value corresponding to one or more of a charging battery level, a charging current, a charging voltage, a charging speed, or a charging power that is required by the wireless charging receiving device.

The communications module 307 is configured to implement data transmission between the wireless charging transmission device 200 and the wireless charging receiving device 300. Optionally, the communications module 307 implements interaction in a wireless communication manner, for example, one or more of manners such as BLUETOOTH, WI-FI, ZIGBEE, RFID, LORA, or NFC.

The receiving module 301 is configured to receive an energy signal, convert the energy signal into electric energy, and store the electric energy in the battery module 302. Optionally, the receiving module 301 includes at least a receive antenna and a conversion unit. The receive antenna is configured to receive the energy signal, and convert the energy signal into alternating current electric energy. The conversion unit is configured to convert the alternating current electric energy, input by the receive antenna, into direct current electric energy, and transmit the direct current electric energy to the battery module. Optionally, the receive antenna includes an inductance component and a capacitor component that may be configured to receive active power and reactive power that are transmitted by the wireless charging transmission device 200. According to different connection manners between the inductance component and the capacitor component, the receive antenna may have any structure shown in FIG. 2.

The battery module 302 is configured to store the electric energy input by the receiving module 301. The battery module 302 is also configured to supply power to the wireless charging receiving device 300. Further, the battery module 302 is a rechargeable battery. Optionally, the battery module 302 is a rechargeable lithium battery, a metal-air battery, or a lithium-sulfur battery.

The control module 303 is configured to configure a receiving parameter, and control a start and a stop of wireless charging. Further, configuring a receiving parameter is adjusting at least one of a voltage, a current, or a frequency of a receiving conversion circuit according to the wireless charging requirement to output the electric energy that is applicable to the battery module 302.

The first storage module 305 is configured to store configuration information of the wireless charging receiving device 300. Optionally, the configuration information of the wireless charging receiving device 300 is set by default at delivery or is entered by a user.

The second storage module 306 is configured to store data generated or received in a wireless charging process.

Optionally, the first storage module 305 and the second storage module 306 are integrated in a same memory.

Optionally, the wireless charging receiving device 300 further includes a user input module 310 and a display module 311. Further, the display module is configured to present a parameter related to the wireless charging process to the user. The user input module is configured to enter, by the user, an instruction and a parameter that are related to the wireless charging.

The external power supply 100 is connected to the wireless charging transmission device 200 using the power entry module 201, and inputs the electric energy into the wireless charging transmission device 200. Further, the power entry module 201 of the wireless charging transmission device 200 receives the electric energy input by the external power supply 100 and transmits the received electric energy to the transmission module 202. The transmission module 202 processes the input electric energy, that is, converts the input electric energy into the energy signal. Optionally, when the electric energy input by the external power supply 100 is the alternating current electric energy, the power factor correction unit of the transmission module 202 processes the alternating current electric energy in order to ensure that a phase of a current input by the system is consistent with a phase of a voltage of a power grid, reduces harmonic content of the system, and increases a power factor value in order to reduce pollution of the system to the power grid, and improve security and reliability. Optionally, the power factor correction unit may further reduce a voltage according to a lower-level requirement. The voltage inverter unit of the transmission module 202 may convert the voltage, output by the power factor correction unit, into a high-frequency alternating current electric energy voltage, and transmit the high-frequency alternating current electric energy to the transmit antenna of the transmission module 202. The transmit antenna converts the high-frequency alternating current electric energy into magnetic field energy of a magnetic field using a coil. Optionally, when the electric energy input by the external power supply 100 is the direct current electric energy, the voltage transformer unit of the transmission module 202 converts the input direct current electric energy into the alternating current electric energy. The inverter unit converts the electric energy obtained by the voltage transformer unit into high-frequency electric energy, and transmits the high-frequency electric energy to the transmit antenna of the transmission module 202. The transmit antenna converts the high-frequency electric energy into magnetic field energy of a magnetic field using a coil.

Optionally, the connection module 309 of the wireless charging receiving device 300 determines that the wireless charging receiving device 300 is already connected to the wireless charging transmission device 200. Optionally, the connection module 206 of the wireless charging transmission device 200 determines that the wireless charging transmission device 200 is already connected to the wireless charging receiving device 300. Optionally, the connection module 309 of the wireless charging receiving device 300 determines that the wireless charging receiving device 300 is already connected to the wireless charging transmission device 200, and the connection module 206 of the wireless charging transmission device 200 determines that the wireless charging transmission device 200 is already connected to the wireless charging receiving device 300.

The wireless charging transmission device 200 is connected to and exchanges data with the communications module 307 of the wireless charging receiving device 300 using the communications module 205. For example, the wireless charging requirement is transmitted by the wireless charging receiving device 300 to the wireless charging transmission device 200, and the configuration information of the wireless charging transmission device 200 is transmitted to the wireless charging receiving device 300.

The wireless charging transmission device 200 receives the wireless charging requirement sent by the wireless charging device 300, adjusts the transmission parameter according to the wireless charging requirement using the control module 203, and then converts the electric energy into the energy signal based on the transmission parameter using the transmission module 202. The wireless charging receiving device 300 receives, using the receiving module 301, the energy signal transmitted by the wireless charging transmission device 200.

In this embodiment of the present disclosure, the wireless charging receiving device formulates a personalized wireless charging requirement according to one or more of a monitored use environment, status parameter, or historical charging record of the wireless charging receiving device, the wireless charging transmission device adjusts the transmission parameter according to the wireless charging requirement, and the wireless charging receiving device adjusts the receiving parameter according to the wireless charging requirement, thereby implementing intelligent control over the wireless charging process, and satisfying the personalized charging requirement of the user.

Figure 3:
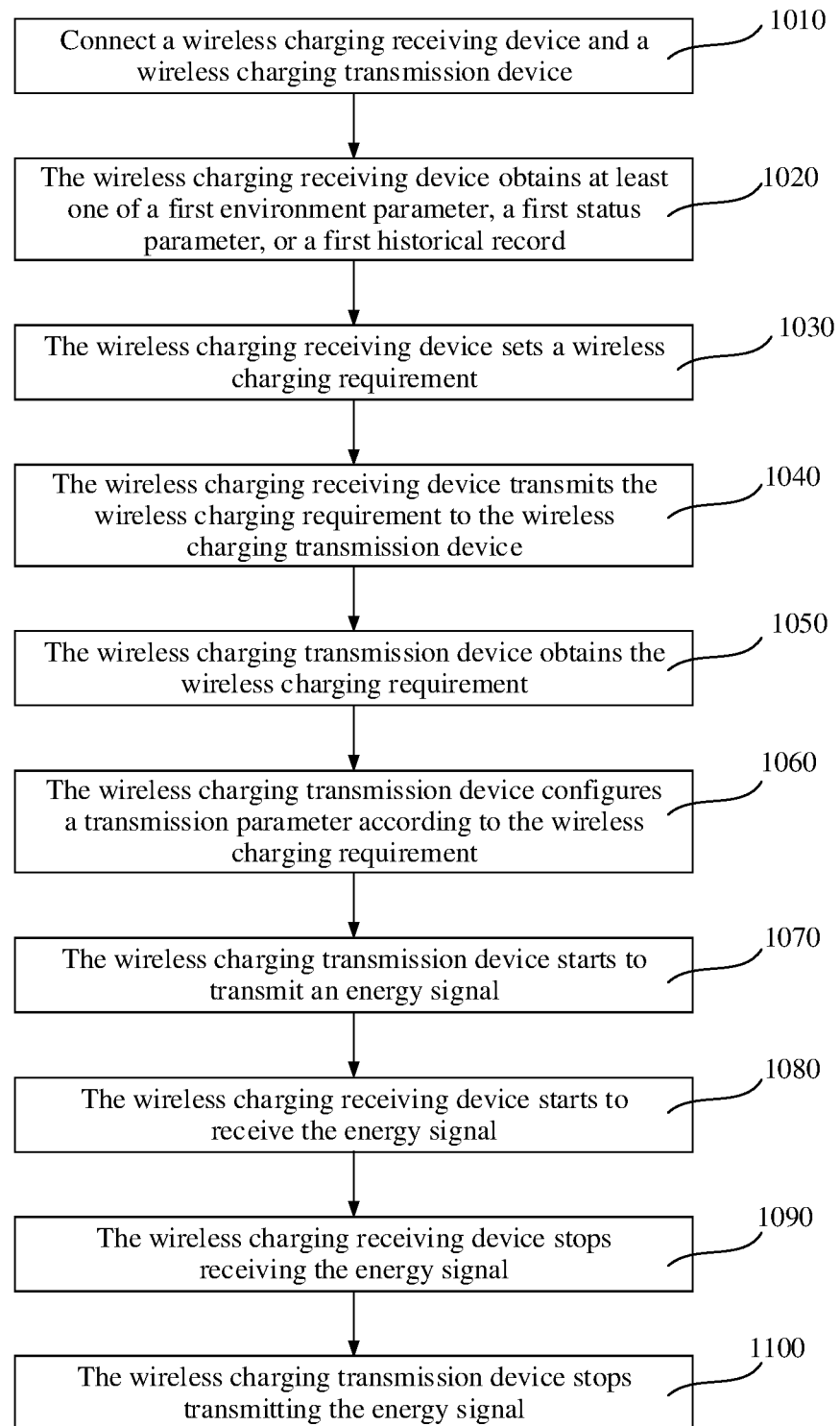
FIG. 3 is a flowchart of an intelligent wireless charging control method according to an embodiment of the present disclosure.

An embodiment of the present disclosure provides an intelligent wireless charging control method. As shown in FIG. 3, the method includes the following steps.

Step 1010. Connect a wireless charging receiving device and a wireless charging transmission device.

Further, connecting a wireless charging receiving device and a wireless charging transmission device includes wireless charging function matching and wireless charging location alignment. The wireless charging function matching is that at least one wireless charging communications protocol of the wireless charging receiving device is matched successfully with that of the wireless charging transmission device. The wireless charging location alignment is that the wireless charging transmission device is located in a wireless charging receiving region of the wireless charging receiving device.

Optionally, a sensor is used to determine the wireless charging location alignment. For example, an infrared sensor is used to detect whether there is a wireless charging receiving device that is disposed in a wireless charging transmission region, an ultrasonic sensor is used to determine, by comparing a distance between an ultrasonic wave transmission location and an ultrasonic wave receiving location, whether there is a wireless charging receiving device that is disposed in a wireless charging transmission region, or a pressure sensor is used to determine, using pressure sensing, whether there is a wireless charging receiving device that is disposed in a wireless charging transmission region. Likewise, this may be applicable to the wireless charging receiving device to determine whether there is a wireless charging transmission device that is located in the wireless charging receiving region.

Step 1020. The wireless charging receiving device obtains at least one of a first environment parameter, a first status parameter, or a first historical record, where the first environment parameter includes at least one of a geographical location, a temperature, humidity, an altitude, or a time of an environment in which the first device is located, the first status parameter includes at least one of a battery level, a temperature, a voltage, or an energy consumption rate of the first device, and the first historical record is a previous wireless charging data record of the first device.

Step 1030. The wireless charging receiving device sets a wireless charging requirement according to at least one of the first environment parameter, the first status parameter, or the first historical record. Optionally, the wireless charging requirement may be a parameter value corresponding to one or more of a charging battery level, a charging current, a charging voltage, a charging speed, or charging power that is required by the wireless charging receiving device. Optionally, configuration information sent by the wireless charging transmission device or a status parameter of the wireless charging transmission device is obtained. Further, when setting the wireless charging requirement, the wireless charging receiving device references the configuration information of the connected wireless charging transmission device or the status parameter of the wireless charging transmission device. Further, if there is more than one connected wireless charging transmission device, a wireless charging transmission device may be selected according to configuration information of the wireless charging transmission device or a status of the wireless charging transmission device, for charging.

Step 1040. The wireless charging receiving device transmits the wireless charging requirement to the wireless charging transmission device.

Optionally, the wireless charging receiving device transmits the wireless charging requirement to the wireless charging transmission device using wireless communication.

Step 1050. The wireless charging transmission device obtains the wireless charging requirement from the wireless charging receiving device that needs to be charged.

Step 1060. The wireless charging transmission device configures a transmission parameter according to the wireless charging requirement.

Further, configuring a transmission parameter includes at least one of configuring wireless charging transmit power or configuring a wireless charging right. Configuring wireless charging transmit power is adjusting at least one of a voltage, a current, or a frequency of a transmission conversion circuit according to the wireless charging requirement, to ensure output of an energy signal that is matched with the wireless charging requirement. Configuring a wireless charging right is setting a first right for the wireless charging receiving device. The first right corresponds to at least one of a charging time, charging efficiency, a charging rate, or a charging mode of the wireless charging transmission device.

Step 1070. The wireless charging transmission device generates a wireless charging start instruction, sends the wireless charging instruction to the wireless charging receiving device, and starts to transmit an energy signal, where the energy signal indicates intermediate energy that is obtained by converting electric energy and that can be converted back into the electric energy.

Step 1080. After receiving the wireless charging start instruction, the wireless charging receiving device starts to receive the energy signal.

Step 1090. The wireless charging receiving device generates a wireless charging stop instruction, sends the wireless charging stop instruction to the wireless charging transmission device, and stops receiving the energy signal.

Further, the wireless charging receiving device traces and monitors a second status parameter of the wireless charging receiving device. The second status parameter includes at least one of a charged battery level, the charging voltage, the charging current, the charging power, charging costs, or the temperature of the wireless charging receiving device. The wireless charging receiving device generates the wireless charging stop instruction according to the second status parameter or an end instruction entered by a user.

Step 1100. After receiving the wireless charging stop instruction, the wireless charging transmission device stops transmitting the energy signal.

In this embodiment of the present disclosure, the wireless charging receiving device formulates a personalized wireless charging requirement according to one or more of a monitored use environment, status parameter, or historical charging record of the wireless charging receiving device, the wireless charging transmission device adjusts the transmission parameter according to the wireless charging requirement, and the wireless charging receiving device adjusts a receiving parameter according to the wireless charging requirement, thereby implementing intelligent control over a wireless charging process, and satisfying the personalized charging requirement of the user.

Figure 4:
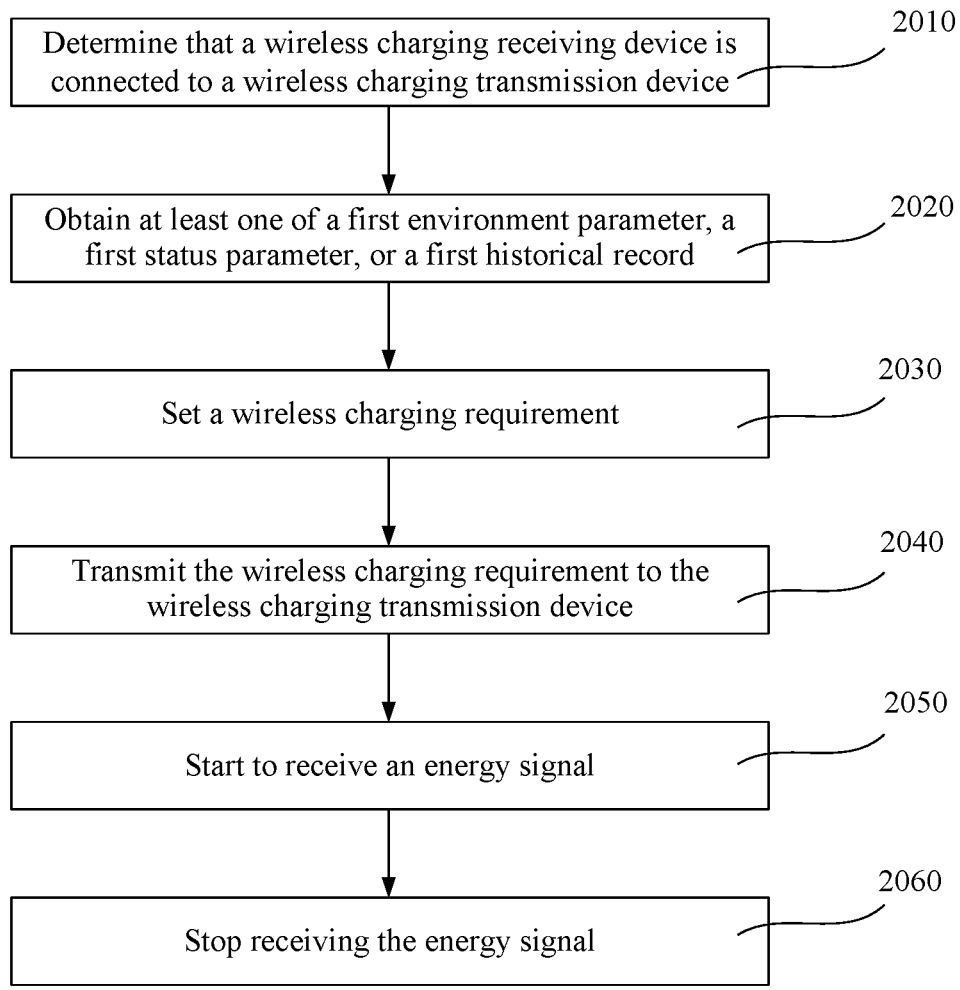
FIG. 4 is a flowchart of a method for intelligently controlling a wireless charging receiving device according to an embodiment of the present disclosure.

An embodiment of the present disclosure provides a method for intelligently controlling a wireless charging receiving device. As shown in FIG. 4, the method includes the following steps.

Step 2010. Determine that the wireless charging receiving device is connected to a wireless charging transmission device.

Further, determining that a wireless charging receiving device is connected to a wireless charging transmission device includes wireless charging function matching and wireless charging location alignment.

The wireless charging function matching is that at least one wireless charging communications protocol of the wireless charging receiving device is matched successfully with that of the wireless charging transmission device.

The wireless charging location alignment is that the wireless charging transmission device is located in a wireless charging receiving region of the wireless charging receiving device. Optionally, a sensor is used to determine the wireless charging location alignment. For example, an infrared sensor is used to detect whether there is a wireless charging transmission device that is located in the wireless charging receiving region, an ultrasonic sensor is used to determine, by comparing a distance between an ultrasonic wave transmission location and an ultrasonic wave receiving location, whether there is a wireless charging transmission device that is located in the wireless charging receiving region, or a pressure sensor is used to determine, using pressure sensing, whether there is a wireless charging transmission device that is located in the wireless charging receiving region.

Step 2020. Obtain at least one of a first environment parameter, a first status parameter, or a first historical record.

Further, the first environment parameter includes at least one of a geographical location, a temperature, humidity, an altitude, or a time of an environment in which the wireless charging receiving device is located.

The first status parameter includes at least one of a battery level, a temperature, a voltage, or an energy consumption rate of the wireless charging receiving device.

The first historical record is a previous wireless charging data record of the wireless charging receiving device.

Step 2030. Set a wireless charging requirement according to at least one of the first environment parameter, the first status parameter, or the first historical record.

Optionally, the wireless charging requirement may be a parameter value corresponding to one or more of a charging battery level, a charging current, a charging voltage, a charging speed, or charging power that is required by the wireless charging receiving device. Optionally, configuration information sent by the wireless charging transmission device or a status parameter of the wireless charging transmission device is obtained. Further, when setting the wireless charging requirement, the wireless charging receiving device references the configuration information of the connected wireless charging transmission device or the status parameter of the wireless charging transmission device. Further, if there is more than one connected wireless charging transmission device, a wireless charging transmission device may be selected according to configuration information of the wireless charging transmission device or a status of the wireless charging transmission device, for charging.

Step 2040. Transmit the wireless charging requirement to the wireless charging transmission device.

Step 2050. Start to receive an energy signal, where the energy signal is intermediate energy that is obtained by converting electric energy and that can be converted back into the electric energy.

Further, after a wireless charging start instruction fed back by the wireless charging transmission device is received, receiving the energy signal is started.

Step 2060. Stop receiving the energy signal.

Further, a second status parameter of the wireless charging receiving device is traced and monitored.

A wireless charging stop instruction is generated according to the second status parameter or an end instruction entered by a user. The second status parameter includes at least one of a charged battery level, the charging voltage, the charging current, the charging power, charging costs, or the temperature of the wireless charging receiving device.

The wireless charging stop instruction is transmitted to the wireless charging transmission device, and receiving the energy signal is stopped.

Optionally, the energy signal is magnetic field energy or quasi-electrostatic field energy.

In this embodiment of the present disclosure, the wireless charging receiving device formulates a personalized wireless charging requirement according to one or more of a monitored use environment, status parameter, or historical charging record of the wireless charging receiving device, sends the wireless charging requirement to the wireless charging transmission device, and then starts to receive the energy signal after receiving the wireless charging start instruction of the wireless charging transmission device. The wireless charging receiving device interacts with the wireless charging transmission device. Therefore, intelligent control over a wireless charging process can be implemented, and the personalized charging requirement of the user can be satisfied.

Figure 5:
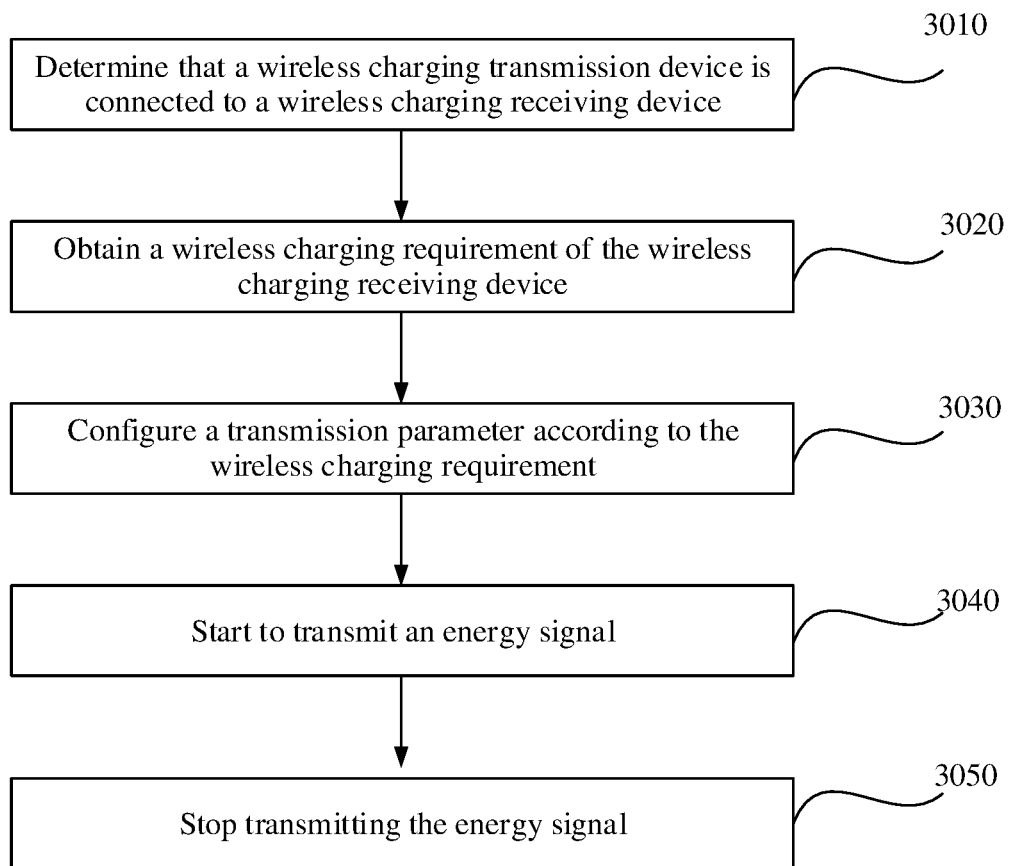
FIG. 5 is a flowchart of a method for intelligently controlling a wireless charging transmission device according to an embodiment of the present disclosure.

An embodiment of the present disclosure provides a method for intelligently controlling a wireless charging transmission device. As shown in FIG. 5, the method includes the following steps.

Step 3010. Determine that the wireless charging transmission device is connected to a wireless charging receiving device.

Further, determining that a wireless charging transmission device is connected to a wireless charging receiving device includes wireless charging function matching and wireless charging location alignment.

The wireless charging function matching is that at least one wireless charging communications protocol of the wireless charging receiving device is matched successfully with that of the wireless charging transmission device.

The wireless charging location alignment is that the wireless charging transmission device is located in a wireless charging receiving region of the wireless charging receiving device. Optionally, a sensor is used to determine the wireless charging location alignment. For example, an infrared sensor is used to detect whether there is a wireless charging receiving device that is disposed in a wireless charging transmission region, an ultrasonic sensor is used to determine, by comparing a distance between an ultrasonic wave transmission location and an ultrasonic wave receiving location, whether there is a wireless charging receiving device that is disposed in a wireless charging transmission region, or a pressure sensor is used to determine, using pressure sensing, whether there is a wireless charging receiving device that is disposed in a wireless charging transmission region.

Step 3020. Obtain a wireless charging requirement of the wireless charging receiving device.

Step 3030. Configure a transmission parameter according to the wireless charging requirement.

Further, configuring a transmission parameter includes at least one of configuring wireless charging transmit power or configuring a wireless charging right. Configuring wireless charging transmit power is adjusting at least one of a voltage, a current, or a frequency of a transmission conversion circuit according to the wireless charging requirement, to ensure output of an energy signal that is matched with the wireless charging requirement. Configuring a wireless charging right is setting a first right for the wireless charging receiving device. The first right corresponds to at least one of a charging time, charging efficiency, a charging rate, or a charging mode of the wireless charging transmission device.

Step 3040. Start to transmit an energy signal, where the energy signal is intermediate energy that is obtained by converting electric energy and that can be converted back into the electric energy.

Further, the starting to transmit an energy signal includes generating, by the wireless charging transmission device, a wireless charging start instruction after configuring a transmission parameter is completed, and transmitting the wireless charging start instruction to the wireless charging receiving device, and starting to transmit the energy signal.

Step 3050. Stop transmitting the energy signal.

Further, stop transmitting the energy signal is stopping transmitting the energy signal after receiving a wireless charging stop instruction fed back by the wireless charging receiving device.

Optionally, configuration information of the wireless charging transmission device is sent to the wireless charging receiving device. Optionally, the configuration information of the wireless charging transmission device is set by default at delivery or is customized by a user.

Optionally, a status parameter of the wireless charging transmission device is obtained, and the obtained status parameter of the wireless charging transmission device is sent to the wireless charging receiving device. Further, the status parameter includes at least one of a battery level, a temperature, a voltage, or an energy consumption rate of the wireless charging transmission device.

Optionally, the energy signal is magnetic field energy or quasi-electrostatic field energy.

In this embodiment of the present disclosure, the wireless charging transmission device receives, before starting to transmit the energy signal, the wireless charging requirement sent by the wireless charging receiving device, and adjusts the transmission parameter according to the wireless charging requirement. Therefore, intelligent control over a wireless charging process can be implemented, and a personalized charging requirement of the user can be satisfied.

Figure 6:
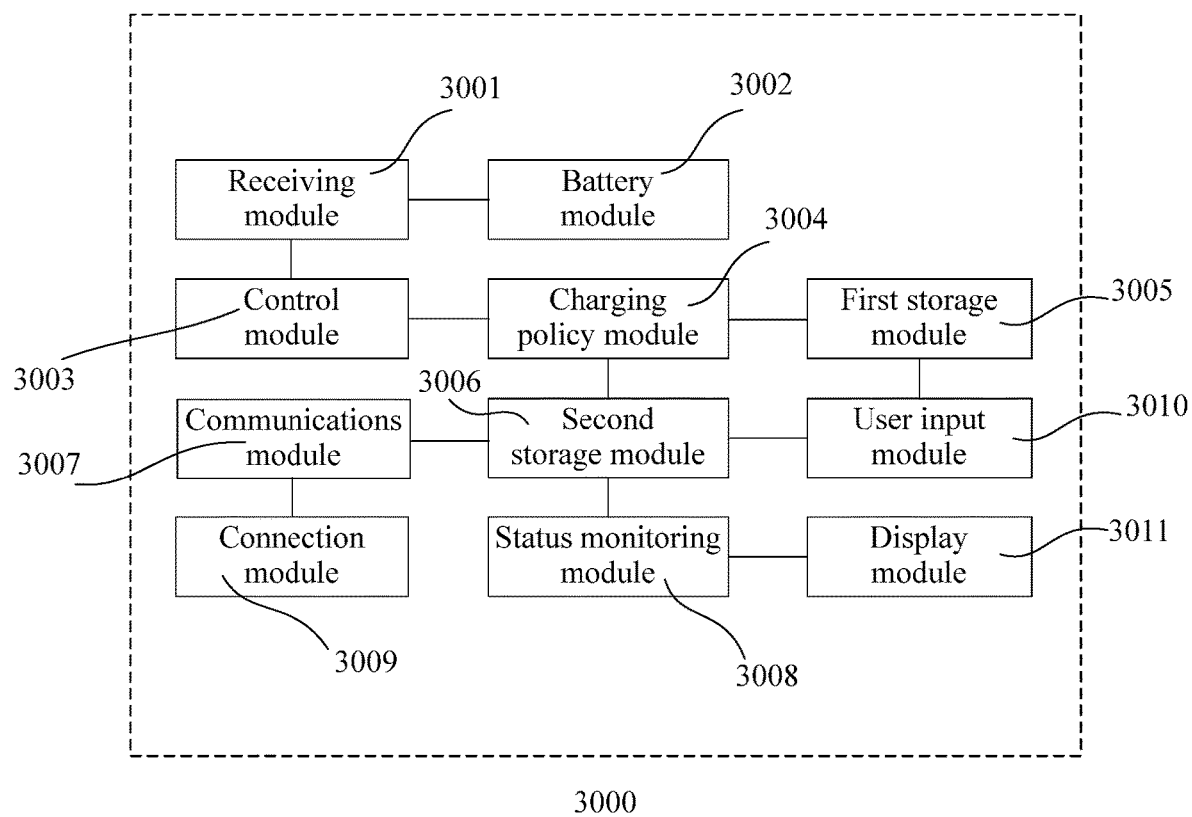
FIG. 6 is a schematic structural diagram of a wireless charging receiving device according to an embodiment of the present disclosure.

An embodiment of the present disclosure provides a wireless charging receiving device 3000. As shown in FIG. 6, the device 3000, that is, the wireless charging receiving device 3000, includes a receiving module 3001, a battery module 3002, a control module 3003, a charging policy module 3004, a first storage module 3005, a second storage module 3006, a communications module 3007, a status monitoring module 3008, and a connection module 3009.

The connection module 3009 is configured to determine that the wireless charging receiving device 3000 is connected to an external wireless charging transmission device. Further, the connection module 3009 includes a function matching unit and a location alignment unit. The function matching unit is configured to determine that at least one wireless charging communications protocol of the wireless charging receiving device 3000 is matched successfully with that of the external wireless charging transmission device. The location alignment unit is configured to determine that the external wireless charging transmission device is located in a wireless charging receiving region of the wireless charging receiving device 3000.

The status monitoring module 3008 is configured to obtain at least one of a first environment parameter, a first status parameter, or a first historical record. The first environment parameter includes at least one of a geographical location, a temperature, humidity, an altitude, or a time of an environment in which the wireless charging receiving device 3000 is located. The first status parameter includes at least one of a battery level, a temperature, a voltage, or an energy consumption rate of the wireless charging receiving device 3000. The first historical record is a previous wireless charging data record of the wireless charging receiving device 3000.

The charging policy module 3004 is configured to set a wireless charging requirement based on at least one of the obtained first environment parameter, first status parameter, or first historical record. Optionally, when setting the wireless charging requirement, the charging policy module references one or more of configuration information, a related environment parameter, a status parameter, or a historical charging record of the external wireless charging transmission device. Optionally, the wireless charging requirement may be a parameter value corresponding to one or more of a charging battery level, a charging current, a charging voltage, a charging speed, or charging power that is required by the wireless charging receiving device.

The communications module 3007 is configured to implement data transmission between the external wireless charging transmission device and the wireless charging receiving device 3000. Optionally, the communications module 3007 implements interaction in a wireless communication manner, for example, one or more of manners such as BLUETOOTH, WI-FI, ZIGBEE, RFID, LORA, or NFC.

The receiving module 3001 is configured to receive an energy signal, convert the energy signal into electric energy, and store the electric energy in the battery module 3002. Optionally, the receiving module 3001 includes at least a receive antenna and a conversion unit. The receive antenna is configured to receive the energy signal, and convert the energy signal into alternating current electric energy. The conversion unit is configured to convert the alternating current electric energy, input by the receive antenna, into direct current electric energy, and transmit the direct current electric energy to the battery module. Optionally, the receive antenna includes an inductance component and a capacitor component that may be configured to receive active power and reactive power that are transmitted by the external wireless charging transmission device. According to different connection manners between the inductance component and the capacitor component, the receive antenna may have any structure shown in FIG. 2.

The battery module 3002 is configured to store the electric energy input by the receiving module 3001. The battery module 3002 is also configured to supply power to the wireless charging receiving device 3000. Further, the battery module 3002 is a rechargeable battery. Optionally, the battery module 3002 is a rechargeable lithium battery, a metal-air battery, or a lithium-sulfur battery.

The control module 3003 is configured to configure a receiving parameter, and control a start and a stop of wireless charging. Further, the configuring a receiving parameter is adjusting at least one of a voltage, a current, or a frequency of a receiving conversion circuit according to the wireless charging requirement, to output the electric energy that is applicable to the battery module 3002.

The first storage module 3005 is configured to store configuration information of the wireless charging receiving device 3000. Optionally, the configuration information of the wireless charging receiving device 3000 is set by default at delivery or is entered by a user.

The second storage module 3006 is configured to store data generated or received in a wireless charging process. Optionally, the first storage module 3005 and the second storage module 3006 are integrated in a same memory.

Optionally, the wireless charging receiving device 3000 further includes a user input module 3010 and a display module 3011. Further, the display module 3011 is configured to present a parameter related to the wireless charging process to the user. The user input module 3010 is configured to enter, by the user, an instruction and a parameter that are related to the wireless charging.

Optionally, the wireless charging receiving device 3000 is integrated in an intelligent terminal or an electric vehicle.

In this embodiment of the present disclosure, the wireless charging receiving device obtains a use environment, a status parameter, and a historical charging record of the wireless charging receiving device using the status monitoring module, formulates a personalized wireless charging requirement according to one or more of the use environment, the status parameter, or the historical charging record using the charging policy module, then sends the wireless charging requirement to the wireless charging transmission device, and interacts with the wireless charging transmission device using the communications module. Therefore, intelligent control over the wireless charging process can be implemented, and the personalized charging requirement of the user can be satisfied.

Figure 7:
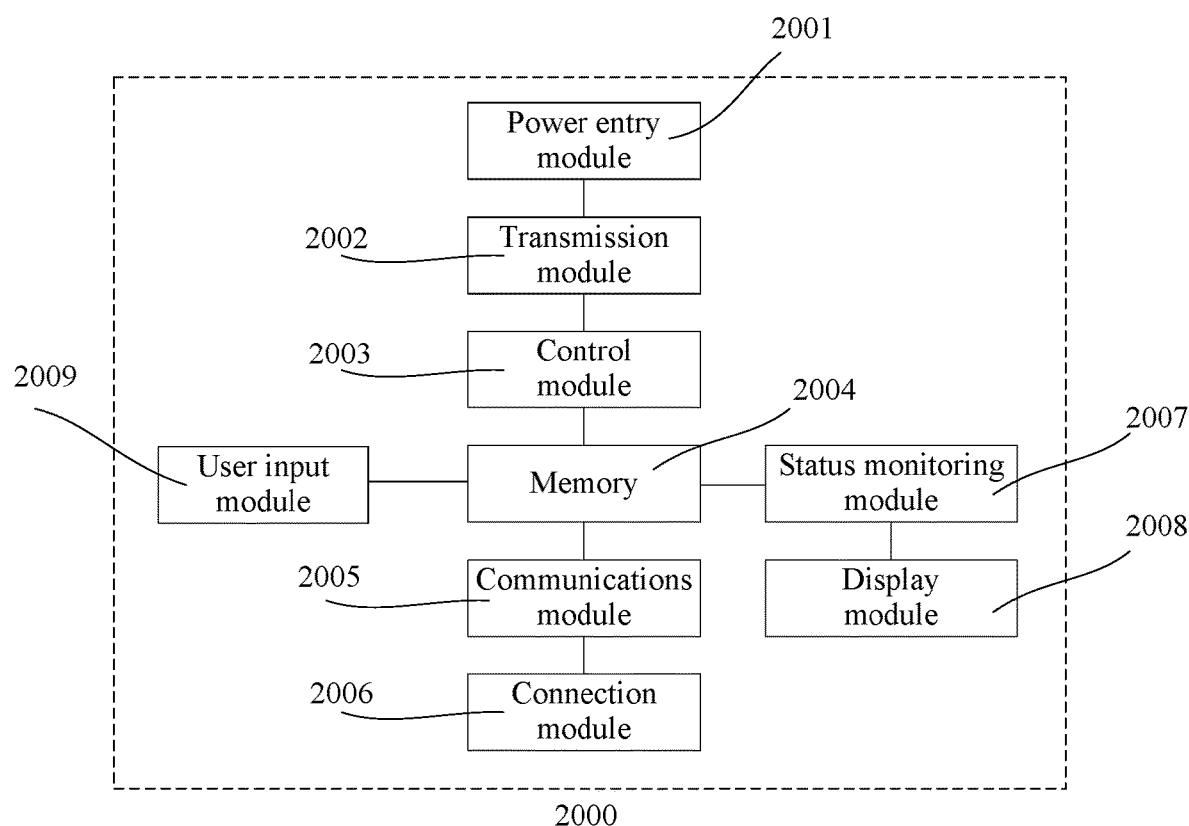
FIG. 7 is a schematic structural diagram of a wireless charging transmission device according to an embodiment of the present disclosure.

An embodiment of the present disclosure provides a wireless charging transmission device 2000. As shown in FIG. 7, the device 2000 includes a power entry module 2001, a transmission module 2002, a control module 2003, a memory 2004, a communications module 2005, and a connection module 2006.

The power entry module 2001 is configured to connect the wireless charging transmission device 2000 and an external power supply, and receive electric energy input by the external power supply.

The connection module 2006 is configured to determine that the wireless charging transmission device 2000 is connected to an external wireless charging receiving device. Further, the connection module 2006 includes a function matching unit and a location alignment unit. The function matching unit is configured to determine that at least one wireless charging communications protocol of the external wireless charging receiving device is matched successfully with that of the wireless charging transmission device 2000.

The location alignment unit is configured to determine that the external wireless charging receiving device is located in a wireless charging transmission region of the wireless charging transmission device 2000.

The communications module 2005 is configured to implement data transmission between the wireless charging transmission device 2000 and the external wireless charging receiving device. Optionally, the communications module 2005 implements interaction in a wireless communication manner, for example, one or more of manners such as BLUETOOTH, WI-FI, ZIGBEE, RFID, LORA, or NFC.

The control module 2003 is configured to configure a transmission parameter, and control a start and a stop of wireless charging. Further, configuring a transmission parameter includes at least one of configuring wireless charging transmit power or configuring a wireless charging right. Further, configuring wireless charging transmit power is adjusting at least one of a voltage, a current, or a frequency of a transmission conversion circuit according to an obtained wireless charging requirement to ensure output of an energy signal that is matched with the charging requirement. The configuring a wireless charging right is setting a first right for the wireless charging receiving device. The first right corresponds to at least one of a charging time, charging efficiency, a charging rate, or a charging mode of the wireless charging transmission device.

The transmission module 2002 is configured to convert the electric energy, input by the external power supply, into the energy signal, and output the energy signal. Further, the energy signal is intermediate energy that is obtained by converting the electric energy and that can be converted back into the electric energy. Further, the transmission module includes a power factor correction unit, an inverter unit, a transformer unit, and a transmit antenna. Further, when the electric energy input by the external power supply is alternating current electric energy, the power factor correction unit is configured to reduce harmonic content in a transmission circuit, and increase a power factor value. When the electric energy input by the external power supply is direct current electric energy, the transformer unit is configured to convert the input direct current electric energy into alternating current electric energy. The inverter unit is configured to convert the alternating current electric energy, output by the power factor correction unit or the transformer unit, into high-frequency alternating current electric energy, and output a high-frequency alternating current electric energy to the power transmit antenna. The transmit antenna is configured to convert the high-frequency alternating current electric energy, input by the inverter unit, into the energy signal, and output the energy signal. Optionally, a receive antenna includes an inductance component and a capacitor component that are configured to output active power and reactive power. According to different connection manners between the inductance component and the capacitor component, the receive antenna may have any structure shown in FIG. 2.

The memory 2004 is configured to store configuration information of the wireless charging transmission device 2000 and data generated or received in a wireless charging process. Optionally, the configuration information of the wireless charging transmission device 2000 is set by default at delivery or is entered by a user.

Optionally, the wireless charging transmission device 2000 further includes a status monitoring module 2007. The status monitoring module 2007 is configured to obtain a status parameter, a use environment, a charging record, and the like of the wireless charging transmission device 2000.

Optionally, the wireless charging transmission device 2000 further includes a display module 2008 and a user input module 2009. The display module 2008 is configured to present a parameter related to the wireless charging process to the user. The user input module 2009 is configured to enter, by the user, an instruction and a parameter that are related to the wireless charging.

In this embodiment of the present disclosure, the wireless charging transmission device 2000 receives, before starting to transmit the energy signal, the wireless charging requirement sent by the wireless charging receiving device, and adjusts the transmission parameter according to the wireless charging requirement. Therefore, intelligent control over the wireless charging process can be implemented, and a personalized charging requirement of the user can be satisfied.

Figure 8:
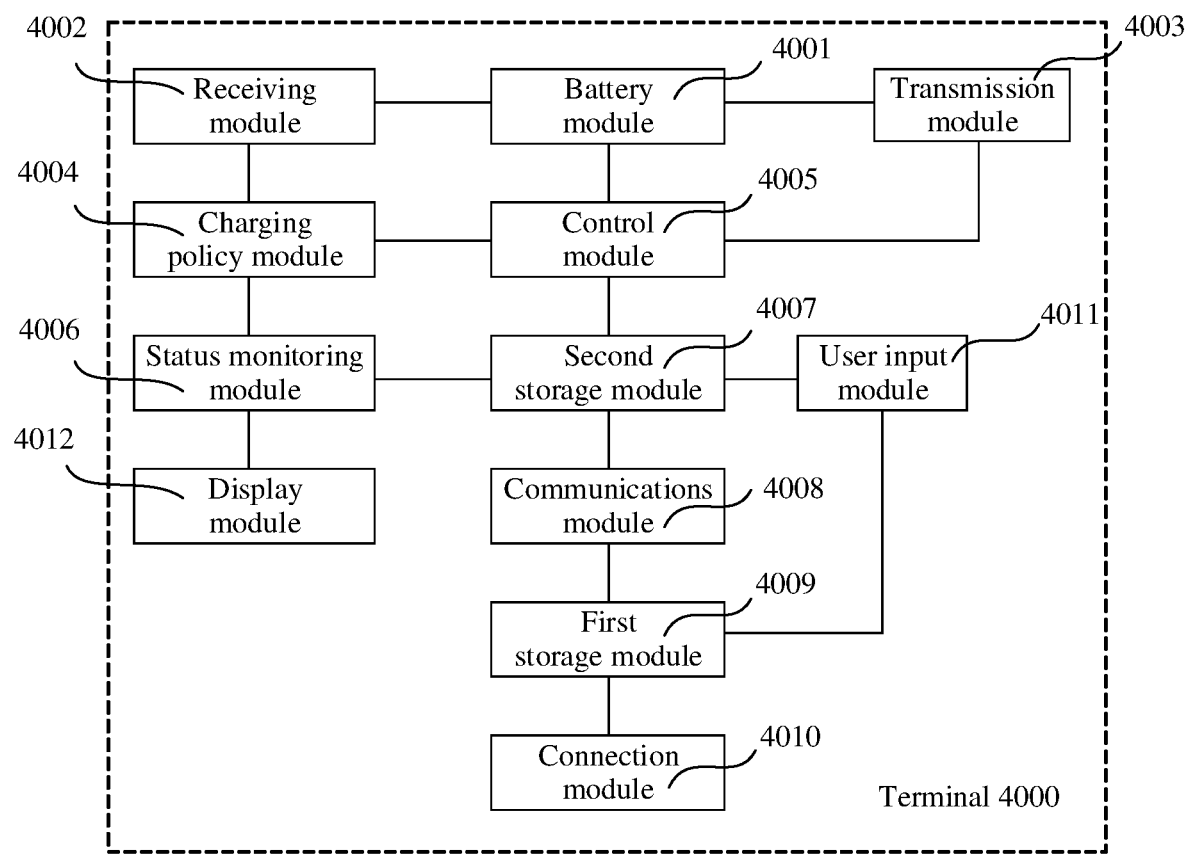
FIG. 8 is a schematic structural diagram of a terminal according to an embodiment of the present disclosure.

An embodiment of the present disclosure provides a terminal 4000. As shown in FIG. 8, the terminal 4000 includes a battery module 4001, a receiving module 4002, a transmission module 4003, a charging policy module 4004, a control module 4005, a status monitoring module 4006, a second storage module 4007, a communications module 4008, a first storage module 4009, and a connection module 4010.

Optionally, the terminal 4000 further includes a user input module 4011 and a display module 4012.

The battery module 4001 is configured to store electric energy input by the receiving module 4002. The battery module 4001 is also configured to supply power to the terminal 4000. Further, the battery module 4001 is a rechargeable battery. Optionally, the battery module 4001 is a rechargeable lithium battery, a metal-air battery, or a lithium-sulfur battery.

The receiving module 4002 receives an energy signal, converts the energy signal into the electric energy, and stores the electric energy in the battery module 4001. Optionally, the receiving module 4002 includes at least a receive antenna and a conversion unit. The receive antenna is configured to receive the energy signal, and convert the energy signal into alternating current electric energy. The conversion unit is configured to convert the alternating current electric energy, input by the receive antenna, into direct current electric energy, and transmit the direct current electric energy to the battery module. Optionally, the receive antenna includes an inductance component and a capacitor component that may be configured to receive active power and reactive power that are transmitted by an external wireless charging transmission device. According to different connection manners between the inductance component and the capacitor component, the receive antenna may have any structure shown in FIG. 2.

The transmission module 4003 is configured to convert the electric energy, input by the battery module 4001, into the energy signal, and output the energy signal. The energy signal is intermediate energy that is obtained by converting the electric energy and that can be converted back into the electric energy.

Further, the transmission module 4003 includes an inverter unit, a transformer unit, and a transmit antenna. Further, the transformer unit is configured to convert the electric energy, input by the battery module 4001, into alternating current electric energy. The inverter unit is configured to convert the alternating current electric energy, output by the transformer unit, into high-frequency alternating current electric energy, and output a high-frequency alternating current electric energy to the power transmit antenna. The transmit antenna is configured to convert the high-frequency alternating current electric energy, input by the inverter unit, into the energy signal, and output the energy signal. Optionally, a receive antenna includes an inductance component and a capacitor component that are configured to output active power and reactive power. According to different connection manners between the inductance component and the capacitor component, the receive antenna may have any structure shown in FIG. 2.

The control module 4005 is configured to configure a receiving parameter, configure a transmission parameter, and control a start and a stop of wireless charging.

Further, configuring a receiving parameter is adjusting at least one of a voltage, a current, or a frequency of a receiving conversion circuit according to a first wireless charging requirement set by the charging policy module to output the electric energy that is applicable to the battery module 4001.

Further, configuring a transmission parameter includes at least one of configuring wireless charging transmit power or configuring a wireless charging right. Configuring wireless charging transmit power is adjusting at least one of a voltage, a current, or a frequency of a transmission conversion circuit according to an obtained second wireless charging requirement set by an external wireless charging receiving device to ensure output of the energy signal that is matched with the second charging requirement. Configuring a wireless charging right is setting a first right for the external wireless charging receiving device. The first right corresponds to at least one of a charging time, charging efficiency, a charging rate, or a charging mode of the terminal 4000.

The status monitoring module 4006 is configured to obtain at least one of a first environment parameter, a first status parameter, or a first historical record. The first environment parameter includes at least one of a geographical location, a temperature, humidity, an altitude, or a time of an environment in which the terminal 4000 is located. The first status parameter includes at least one of a battery level, a temperature, a voltage, or an energy consumption rate of the terminal 4000. The first historical record is a previous wireless charging data record of the terminal 4000.

The charging policy module 4004 is configured to set a wireless charging requirement based on at least one of the obtained first environment parameter, first status parameter, or first historical record. Optionally, when setting the wireless charging requirement, the charging policy module 4004 references one or more of configuration information, a related environment parameter, a status parameter, or a historical charging record of the external wireless charging transmission device. Optionally, the wireless charging requirement may be a parameter value corresponding to one or more of a charging battery level, a charging current, a charging voltage, a charging speed, or charging power that is required by the wireless charging receiving device.

The second storage module 4007 is configured to store data generated or obtained in a wireless charging process.

The communications module 4008 is configured to perform interaction between the terminal 4000 and the external wireless charging transmission device or the external wireless charging receiving device. Optionally, the communications module 4008 implements interaction in a wireless communication manner, for example, one or more of manners such as BLUETOOTH, WI-FI, ZIGBEE, RFID, LORA, or NFC.

The first storage module 4009 is configured to store configuration information of the terminal 4000. Further, the configuration information of the terminal 4000 is set by default at delivery or is customized by a user.

The connection module 4010 is configured to determine that the terminal 4000 is connected to the external wireless charging transmission device or the external wireless charging receiving device. Further, the connection module 4010 includes a function matching unit and a location alignment unit. The function matching unit is configured to determine that at least one wireless charging communications protocol of the terminal 4000 is matched successfully with that of the external wireless charging transmission device or the external wireless charging receiving device. The location alignment unit is configured to determine that the external wireless charging transmission device or the external wireless charging receiving device is located in a wireless charging region of the terminal 4000. Further, the wireless charging region includes a wireless charging receiving region and a wireless charging transmission region.

In this embodiment of the present disclosure, the status monitoring module 4006 obtains data such as a use environment, a status parameter, and a historical charging record of the terminal, and the charging policy module 4004 sets the wireless charging requirement according to the data detected by the status monitoring module 4006 and sends the specified wireless charging requirement to the external wireless charging transmission device in order to obtain wireless charging that is matched with the wireless charging requirement. The wireless charging is started based on the wireless charging requirement, and a wireless charging transmit end interacts with a wireless charging receive end. Therefore, intelligent control over the wireless charging process can be implemented, and a personalized requirement of the user can be satisfied.

Figure 9:
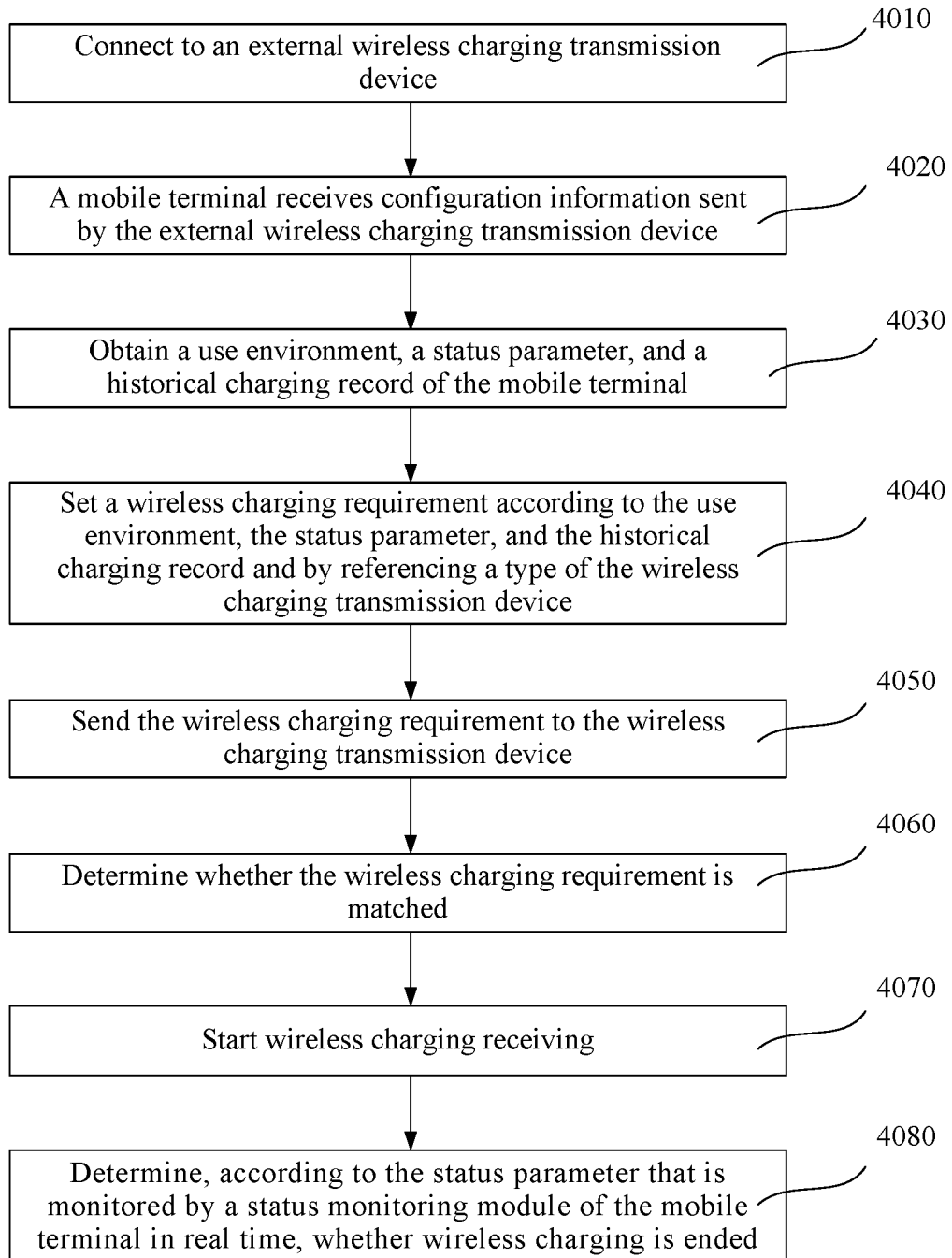
FIG. 9 is a flowchart of wireless charging for a mobile terminal according to an embodiment of the present disclosure.

An embodiment of the present disclosure provides a method for performing wireless charging for a mobile terminal. As shown in FIG. 9, the method includes the following steps.

Step 4010. A mobile terminal enters a wireless charging transmission region of an external wireless charging transmission device, and a connection module of the mobile terminal determines that the mobile terminal is connected to the external wireless charging transmission device.

Step 4020. The mobile terminal receives configuration information sent by the external wireless charging transmission device, and the mobile terminal identifies the external wireless charging transmission device according to the received configuration information of the external wireless charging transmission device. Not only a connection to an insecure wireless charging transmission device is avoided using the identification, but also a charging requirement is set by identifying a type of the external wireless charging device, for example, identifying that the wireless charging transmission device is a wireless charger or another terminal integrating a wireless charging transmission device. Further, the configuration information of the external wireless charging transmission device may be one or more of device attribute information such as a model, a brand, a type, a power parameter, a supported mode, or a service provider.

Step 4030. A status monitoring module of the mobile terminal obtains a use environment, a status parameter, and a historical charging record of the mobile terminal.

Step 4040. A charging policy module sets a wireless charging requirement according to the use environment, the status parameter, and the historical charging record and by referencing a type of the wireless charging transmission device.

Further, for example, because a battery capacity configured for the mobile terminal is limited, a battery life is relatively short. In this case, a charging speed is a critical charging experience requirement of a user. When the mobile terminal determines that the externally connected wireless charging device is a wireless charger, because the wireless charger may support more wireless charging types and has a broader wireless charging power range, the mobile terminal may obtain a charging mode in which the charging speed is optimum. The use environment, the historical charging record, and the status parameter may be used to determine the charging speed. For example, the mobile terminal may obtain location information and scenario information in the environment using a sensor disposed in the mobile terminal, or may obtain location information by identifying the connected wireless charger. Environment information may be associated with a charging intention of the user. For example, when the user is at home or in an office, the user usually has a long time for charging. In this case, an optimum charging speed requirement is a slow charging mode or a standard charging mode in order to avoid risks in charge radiation, charge heating, and reduction of a battery charging life that are caused by fast charging. When the user is in an external strange scenario such as a coffee shop, a restaurant, or a shopping mall, the user merely has a short time for charging. In this case, an optimum charging speed requirement is a fast charging mode in order to satisfy a requirement of rapidly increasing the battery life of the mobile terminal. Further, to ensure that the environment information is more accurately associated with the charging intention of the user, the charging intention of the user may be compared and corrected based on historical charging data of the mobile terminal in the current environment. The historical charging data of the mobile terminal may be historical data recorded by the mobile terminal to establish a charging habit model of the mobile terminal when the user is in different environments such as different time periods, different locations, or different scenarios in order to determine the charging intention in the current environment using the charging habit model. Details are not described herein. For example, when the mobile terminal is in a STARBUCKS coffee shop, and when the mobile terminal is connected a wireless charger for wireless charging, the mobile terminal may read habit information of the user in the location from a storage of the mobile terminal, a network storage, or a cloud storage, to obtain a habitual residence time of the user in the STARBUCKS coffee shop, and further determine duration information of the wireless charging in order to obtain a required optimum charging speed requirement. If the user has not been in the STARBUCKS coffee shop before, the mobile terminal may further read a charging habit of the user in another similar scenario to determine a charging intention in order to obtain an optimum charging speed requirement.

Further, to avoid incorrect adaptive determining of the mobile terminal, the wireless charging speed requirement may further be obtained or determined in a user input interaction manner. That is, when the mobile terminal is connected to an external charger, a user notification and input window is popped up, prompting the user to enter charging parameter information (a charging battery level, a charging time, a charging voltage, a charging current, and the like) in order to obtain or correct the wireless charging speed requirement.

On the contrary, when the external wireless charging transmission device is another mobile terminal device, a wireless charging battery level requirement is determined through negotiation between the devices. When the external wireless charging transmission device is the other mobile terminal device, because a battery capacity configured for the mobile terminal device is relatively limited, in a D2D wireless charging process, a critical charging experience requirement is the wireless charging battery level requirement, and it is determined that normal operating of a discharging device is not affected after D2D charging.

The wireless charging battery level requirement may be determined through D2D communication negotiation. Further, the mobile terminal may send the wireless charging battery level requirement to the external discharging mobile terminal for negotiation, or the discharging mobile terminal device directly sets a discharging battery level.

Step 4050. Send the wireless charging requirement to the wireless charging transmission device. Optionally, the charging requirement information may be a charging speed or a charging battery level that is determined by the mobile terminal in a wireless charging process.

Step 4060. Determine whether the wireless charging requirement is matched. The wireless charging transmission device performs matching according to the received wireless charging requirement of the mobile terminal, to determine whether a charging mode in the wireless charging requirement is supported, and feeds back a matching result to the mobile terminal. For example, the wireless charging transmission device determines, according to the charging speed requirement, whether a charger satisfies a transmit power requirement of supporting fast charging. When the wireless charging transmission device determines that transmit power can support the fast charging, the charging requirement is matched successfully, and wireless charging is performed subsequently, otherwise, the charging requirement fails to be matched, and step 4040 is returned to re-determine a wireless charging requirement.

Step 4070. Start wireless charging receiving, and wireless charging begins.

The mobile terminal controls, using a control module of the mobile terminal, a receiving module of the mobile terminal to convert an external energy signal into direct current electric energy, and stores the direct current electric energy in a battery of the mobile terminal.

Step 4080. Determine, according to the status parameter that is monitored by the status monitoring module of the mobile terminal in real time, whether the wireless charging is ended. The mobile terminal determines, according to one or more of a charging battery level, a charging voltage, a charging current, a charging temperature, charging costs, or an end instruction of the user, whether the charging is ended. After the mobile terminal determines that the charging is ended, a wireless charging end instruction is sent to the wireless charging transmission device using a communications module, and the receiving module is disabled.

In this embodiment of the present disclosure, the mobile terminal interacts with the external wireless charging transmission device, sets the wireless charging requirement according to one or more of the use environment, the status parameter, the historical wireless charging record, or the configuration information of the external charging transmission device, and sends the wireless charging requirement to the external wireless charging transmission device. Therefore, intelligent control over the wireless charging process can be implemented, and a personalized requirement of the user can be satisfied.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for intelligently controlling a wireless charging receiving device, comprising:
    obtaining, by the wireless charging receiving device, at least one of a first environment parameter, a first status parameter, or a first historical record, wherein the first environment parameter comprising at least one of a geographical location, a temperature, humidity, or an altitude of an environment in which the wireless charging receiving device is located, wherein the first status parameter comprising at least one of a battery level, a temperature, a voltage, or an energy consumption rate of the wireless charging receiving device, and wherein the first historical record comprising a previous wireless charging data record of the wireless charging receiving device;
    determining that a wireless charging communications protocol of a wireless charging transmission device is matched successfully with a wireless charging communications protocol of the wireless charging receiving device;
    setting a wireless charging requirement according to at least one of the first environment parameter, the first status parameter, or the first historical record, wherein the wireless charging requirement comprising at least one of a wireless charging voltage, a wireless charging current, wireless charging power, a wireless charging speed, a wireless charging battery level, a wireless charging time, or wireless charging costs;
    sending the wireless charging requirement to the wireless charging transmission device;
    receiving an energy signal indicating energy obtained by the wireless charging transmission device by converting an electric energy according to the wireless charging requirement and that can be converted back into the electric energy by the wireless charging receiving device;
    generating a wireless charging stop instruction according to the wireless charging requirement or a user instruction; and
    sending the wireless charging stop instruction to the wireless charging transmission device.

2. The method of claim 1, wherein before setting the wireless charging requirement, the method further comprises determining that the wireless charging transmission device is located in a wireless charging receiving region of the wireless charging receiving device.

3. The method of claim 1, wherein generating and sending the wireless charging stop instruction comprises:
    monitoring a second status parameter of the wireless charging receiving device comprising at least one of a charged battery level, a charging voltage, a charging current, charging power, or charging costs of the wireless charging receiving device;
    generating the wireless charging stop instruction according to a comparison between the second status parameter and the wireless charging requirement or according to an end instruction from a user;
    stop receiving the energy signal; and
    sending the wireless charging stop instruction to the wireless charging transmission device.

4. The method according to claim 1, wherein before setting the wireless charging requirement, the method further comprises obtaining configuration information sent by the wireless charging transmission device, wherein the configuration information is set by default at delivery or is customized by the user, and wherein the configuration information comprises at least one of a model, a brand, a type, a power parameter, a supported mode, or a service provider of the wireless charging transmission device.

5. A method for intelligently controlling a wireless charging transmission device, comprising:
    determining that a wireless charging communications protocol of the wireless charging transmission device is matched successfully with a wireless charging communications protocol of a wireless charging receiving device;
    obtaining a wireless charging requirement of the wireless charging receiving device, wherein the wireless charging requirement comprising at least one of a wireless charging voltage, a wireless charging current, wireless charging power, a wireless charging speed, a wireless charging battery level, a wireless charging time, or wireless charging costs;
    configuring a transmission parameter according to the wireless charging requirement;
    transmitting an energy signal indicating energy obtained by the wireless charging transmission device by converting electric energy based on the transmission parameter and that can be converted back into the electric energy by the wireless charging receiving device;
    receiving a wireless charging stop instruction from the wireless charging receiving device; and
    stop transmitting the energy signal.

6. The method of claim 5, wherein before obtaining the wireless charging requirement of the wireless charging receiving device, the method further comprises determining that the wireless charging receiving device is located in a wireless charging transmission region of the wireless charging transmission device.

7. The method of claim 5, wherein configuring the transmission parameter comprises at least one of:
    configuring wireless charging transmit power by adjusting at least one of a voltage, a current, or a frequency of a transmission conversion circuit according to the wireless charging requirement to ensure output of the energy signal matched with the wireless charging requirement; or
    configuring a wireless charging right by setting a first right for the wireless charging receiving device according to the wireless charging requirement, wherein the first right corresponding to at least one of a charging time, charging efficiency, a charging rate, or a charging mode of the wireless charging transmission device.

8. The method of claim 5, wherein transmitting the energy signal comprises:
    generating, by the wireless charging transmission device, a wireless charging start instruction after configuring the transmission parameter;
    sending the wireless charging start instruction to the wireless charging receiving device; and
    transmitting the energy signal.

9. A wireless charging receiving device, comprising:
    a status monitoring circuit configured to obtain at least one of a first environment parameter, a first status parameter, or a first historical record, wherein the first environment parameter comprising at least one of a geographical location, a temperature, humidity, or an altitude of an environment in which the wireless charging receiving device is located, wherein the first status parameter comprising at least one of a battery level, a temperature, a voltage, or an energy consumption rate of the wireless charging receiving device, and wherein the first historical record comprising a previous wireless charging data record of the wireless charging receiving device;

a charging policy circuit coupled to the status monitoring circuit and configured to set a wireless charging requirement based on at least one of the first environment parameter, the first status parameter, or the first historical record obtained by the status monitoring circuit, wherein the wireless charging requirement comprising at least one of a wireless charging voltage, a wireless charging current, wireless charging power, a wireless charging speed, a wireless charging battery level, a wireless charging time, or wireless charging costs;

a communications circuit coupled to the status monitoring circuit and the charging policy circuit and configured to exchange data with a wireless charging transmission device;

a receiving circuit coupled to the status monitoring circuit, the charging policy circuit and the communications circuit and configured to:
  receive an energy signal;
  convert the energy signal into electric energy; and
  store the electric energy in a battery, wherein the energy signal indicating energy obtained by the wireless charging transmission device by converting the electric energy according to the wireless charging requirement and that can be converted back into the electric energy by the wireless charging receiving device;

a control circuit coupled to the status monitoring circuit, the charging policy circuit, the communications circuit and the receiving circuit and configured to:
  configure a receiving parameter according to the wireless charging requirement set by the charging policy circuit; and
  control a start and a stop of wireless charging of the wireless charging receiving device, the battery coupled to the status monitoring circuit, the charging policy circuit, the communications circuit, the receiving circuit and the control circuit and configured to:
  store the electric energy received by the receiving circuit; and
  supply power to the wireless charging receiving device;

a first storage coupled to the status monitoring circuit, the charging policy circuit, the communications circuit, the receiving circuit, the control circuit and the battery and configured to store configuration information of the wireless charging receiving device; and a second storage coupled to the status monitoring circuit, the charging policy circuit, the communications circuit, the receiving circuit, the control circuit, the battery and the first storage and configured to store process data.

10. The wireless charging receiving device of claim 9, further comprising a function matching circuit coupled to the status monitoring circuit, the charging policy circuit, the communications circuit, the receiving circuit, the control circuit, the battery, the first storage and the second storage and configured to determine that at least one wireless charging communications protocol of the wireless charging receiving device is matched successfully with a wireless charging communications protocol of the wireless charging transmission device.

11. The wireless charging receiving device of claim 9, further comprising a location alignment circuit coupled to the status monitoring circuit, the charging policy circuit, the communications circuit, the receiving circuit, the control circuit, the battery, the first storage and the second storage and configured to determine that the wireless charging transmission device is located in a wireless charging receiving region of the wireless charging receiving device.

12. The wireless charging receiving device of claim 9, wherein the receiving circuit comprises at least a receive antenna and a converter coupled to the receive antenna, wherein the receive antenna is configured to:
  receive the energy signal; and
  convert the energy signal into alternating current electric energy, and
wherein the converter is configured to:
  convert the alternating current electric energy, obtained through conversion by the receive antenna, into direct current electric energy; and
  transmit the direct current electric energy to the battery.

13. The wireless charging receiving device of claim 12, wherein the converter is further configured to:
  convert the alternating current electric energy, obtained through conversion by the receive antenna, into the direct current electric energy; and
  input the direct current electric energy, obtained through conversion, into the battery as a constant direct current.

14. The wireless charging receiving device of claim 9, wherein configuring the receiving parameter comprises adjusting at least one of a voltage, a current, or a frequency of a receiving conversion circuit according to the wireless charging requirement.

15. A wireless charging transmission device, comprising:
  a power entry circuit configured to obtain an electric energy from an external power supply;
  a communications circuit coupled to the power entry circuit and configured to:
    exchange data with a wireless charging receiving device; and
    receive a wireless charging requirement from the wireless charging receiving device, wherein the wireless charging requirement comprising at least one of a wireless charging voltage, a wireless charging current, wireless charging power, a wireless charging speed, a wireless charging battery level, a wireless charging time, or wireless charging costs;
  a control circuit coupled to the power entry circuit and the communications circuit and configured to:
    configure a transmission parameter according to the wireless charging requirement received by the communications circuit; and
    control a start and a stop of wireless charging of the wireless charging transmission device;
  a transmission circuit coupled to the power entry circuit, the communications circuit and the control circuit and configured to:
    convert, based on the transmission parameter, the electric energy obtained by the power entry circuit into an energy signal; and
    output the energy signal, the energy signal indicating energy obtained by the wireless charging transmission device by converting the electric energy according to the wireless charging requirement and converted back into the electric energy by the wireless charging receiving device;

a first storage coupled to the power entry circuit, the communications circuit, the control circuit and the transmission circuit and configured to store configuration information of the wireless charging transmission device; and a second storage coupled to power entry circuit, the communications circuit, the control circuit, the transmission circuit and the first storage and configured to store process data.

16. The wireless charging transmission device of claim 15, further comprising a function matching circuit coupled to the power entry circuit, the communications circuit, the control circuit, the transmission circuit, the first storage and the second storage and configured to determine that at least one wireless charging communications protocol of the wireless charging transmission device is matched successfully with a wireless charging communications protocol of the wireless charging receiving device.

17. The wireless charging transmission device of claim 15, further comprising a location alignment circuit coupled to the power entry circuit, the communications circuit, the control circuit, the transmission circuit, the first storage and the second storage and configured to determine that the wireless charging receiving device is located in a wireless charging transmission region of the wireless charging transmission device.

18. The wireless charging transmission device of claim 15, wherein the transmission circuit comprises a transmit antenna, and wherein the transmission circuit is further configured to:

reduce harmonic content in the transmission circuit, and increase a power factor value when the electric energy from the external power supply comprises alternating current electric energy;

convert input direct current electric energy into the alternating current electric energy when the electric energy from the external power supply comprises the direct current electric energy;

convert the alternating current electric energy into high-frequency alternating current electric energy; and output the high-frequency alternating current electric energy to the transmit antenna, and wherein the transmit antenna is configured to:

convert the high-frequency alternating current electric energy into the energy signal; and output the energy signal.

19. The wireless charging transmission device of claim 15, wherein when configuring the transmission parameter, the control circuit is further configured to perform at least one of:

configure wireless charging transmit power by adjusting at least one of a voltage, a current, or a frequency of a transmission conversion circuit according to the wireless charging requirement received by the communications circuit to ensure output of the energy signal matched with the wireless charging requirement; or configure a wireless charging right by setting a first right for the wireless charging receiving device according to the wireless charging requirement received by the communications circuit, wherein the first right corresponding to at least one of a charging time, charging efficiency, a charging rate, or a charging mode of the wireless charging transmission device.

20. The wireless charging transmission device of claim 15, further comprising a status monitoring circuit coupled to the power entry circuit, the communications circuit, the control circuit, the transmission circuit, the first storage and the second storage and configured to obtain a second environment parameter, a second status parameter, and a second historical record, wherein the second environment parameter comprising at least one of a geographical location, a temperature, humidity, an altitude, or a time of an environment in which the wireless charging transmission device is located, wherein the second status parameter comprising at least one of a battery level, a temperature, a voltage, or an energy consumption rate of the wireless charging transmission device, and wherein the second historical record comprising a previous wireless charging data record of the wireless charging transmission device.

\* \* \* \* \*